Dec. 8, 1970   H. J. DIELMAN   3,545,032
CAM OPERATED HINGE ASSEMBLIES
Original Filed Jan. 18, 1965   8 Sheets-Sheet 1
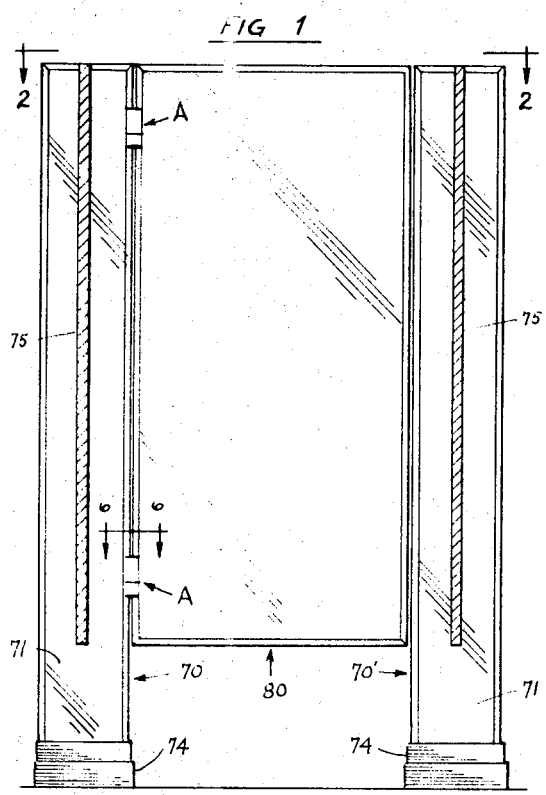
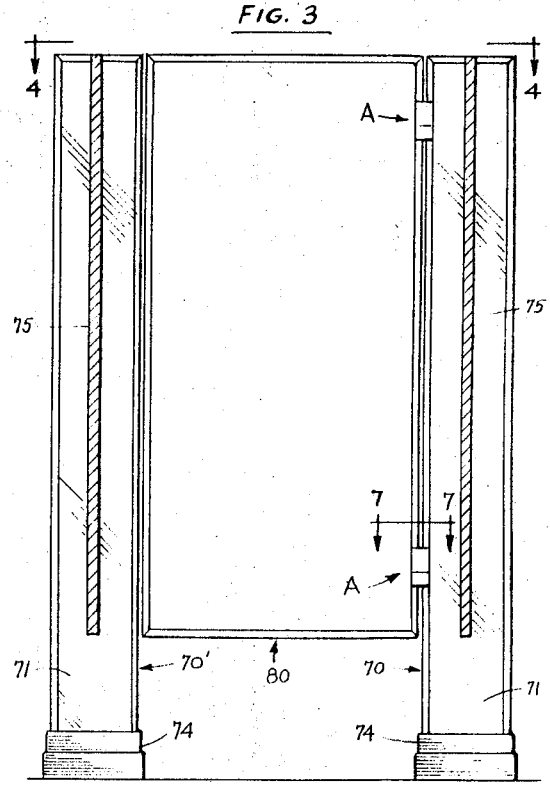
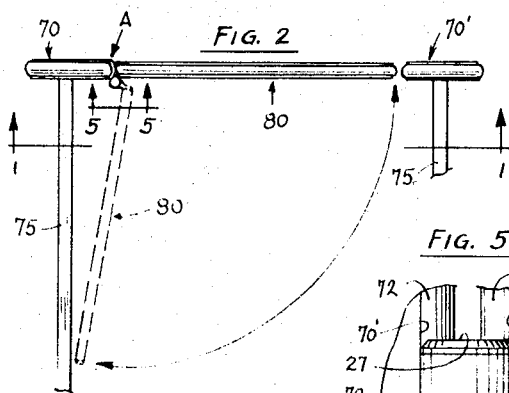
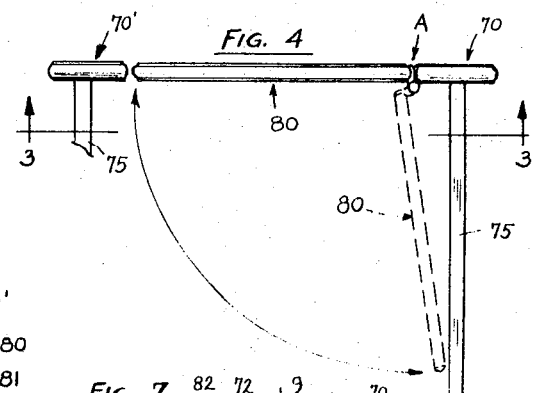
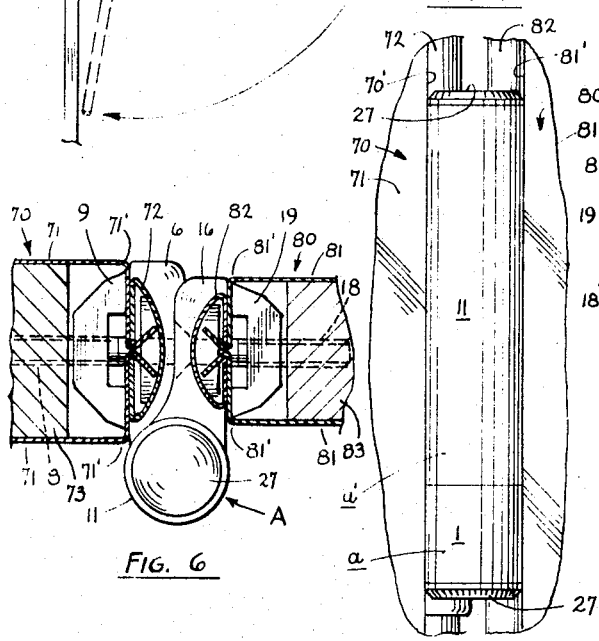
INVENTOR.
HAROLD J. DIELMAN
BY
Reuben J. Carlson
Attorney

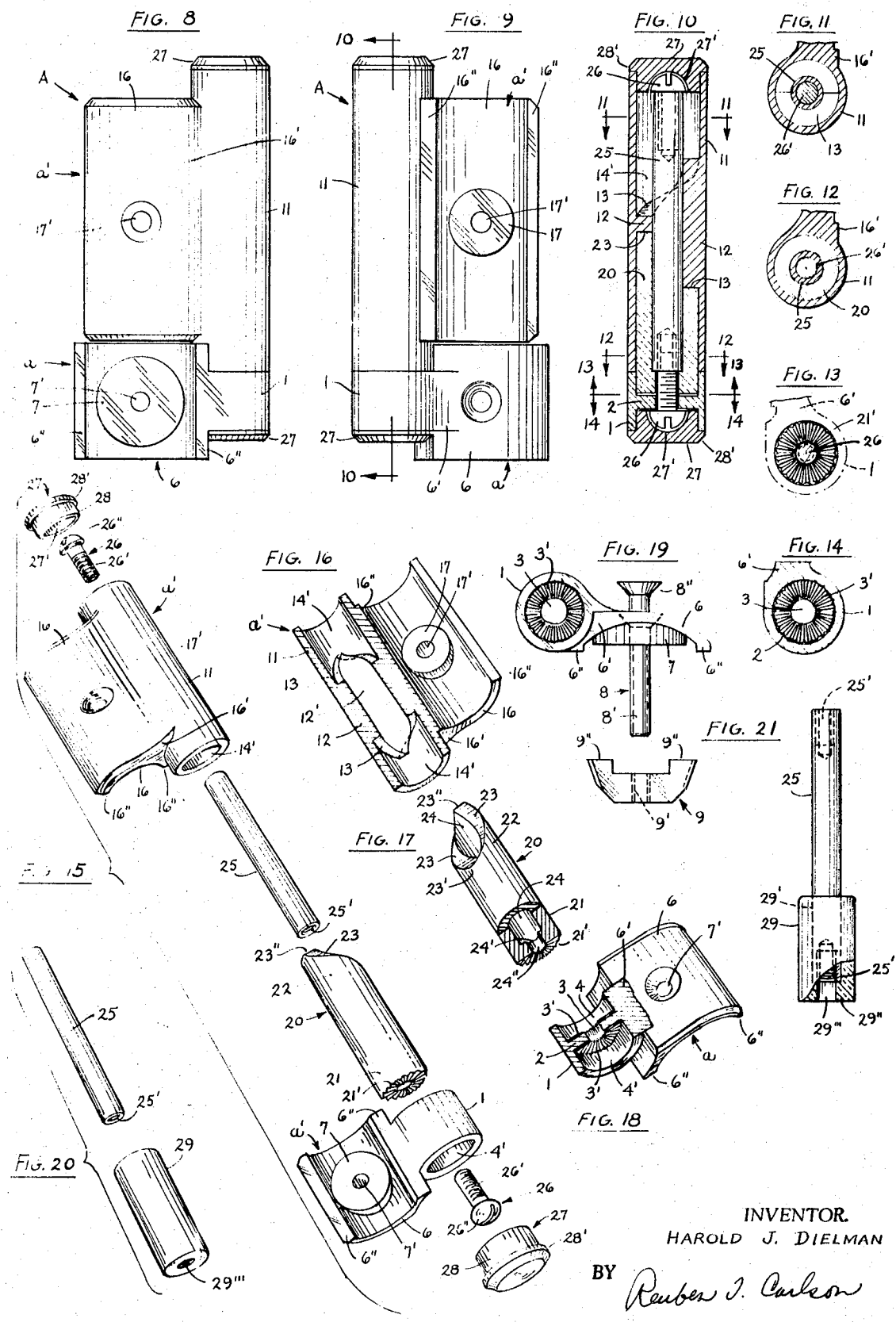

Dec. 8, 1970 H. J. DIELMAN 3,545,032
CAM OPERATED HINGE ASSEMBLIES
Original Filed Jan. 18, 1965 8 Sheets-Sheet 3
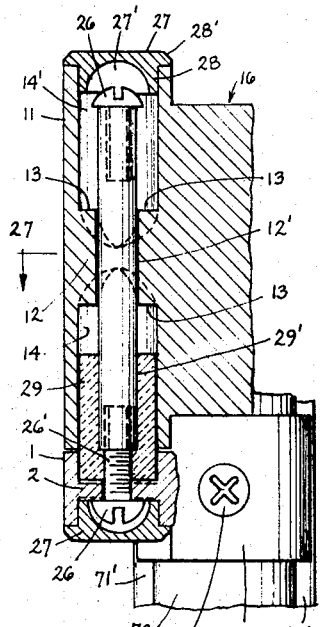
FIG. 26
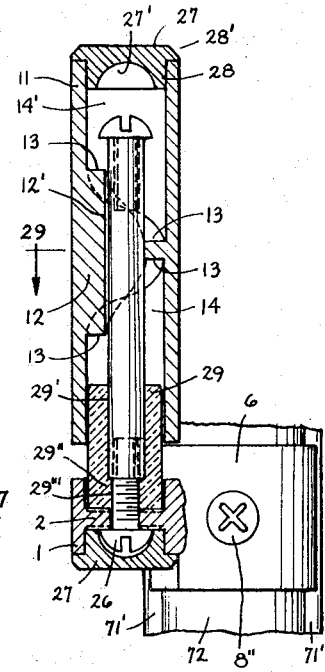
FIG. 28
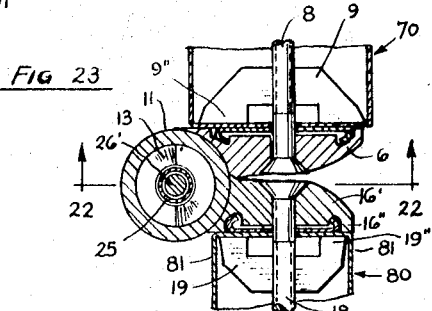
FIG. 27
FIG. 29
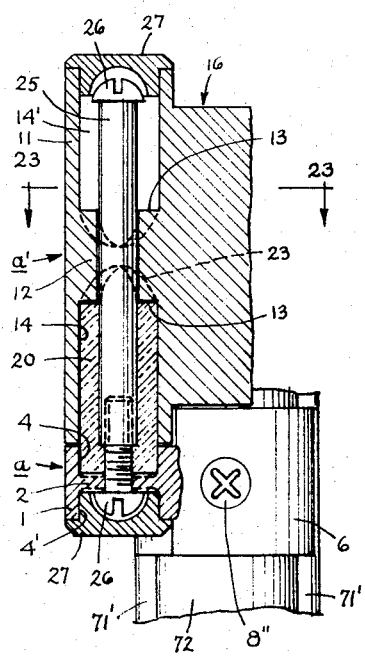
FIG. 22
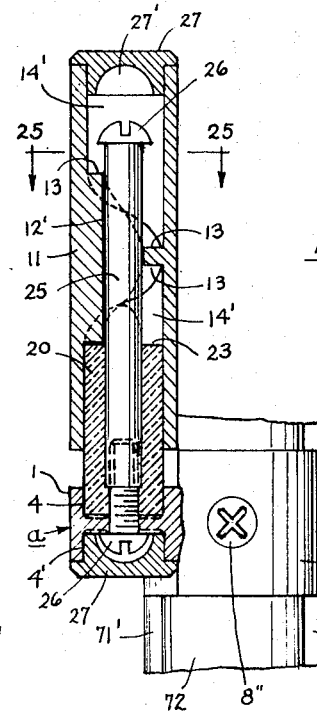
FIG. 24
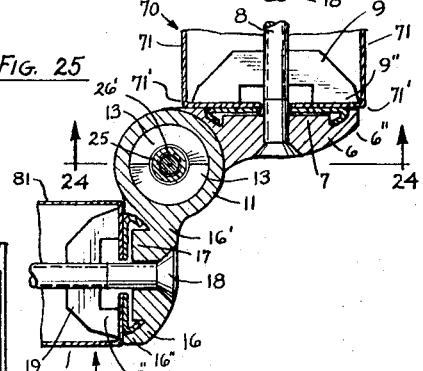
FIG. 23
FIG. 25
INVENTOR.
HAROLD J. DIELMAN
BY
Reuben J. Carlson
Attorney

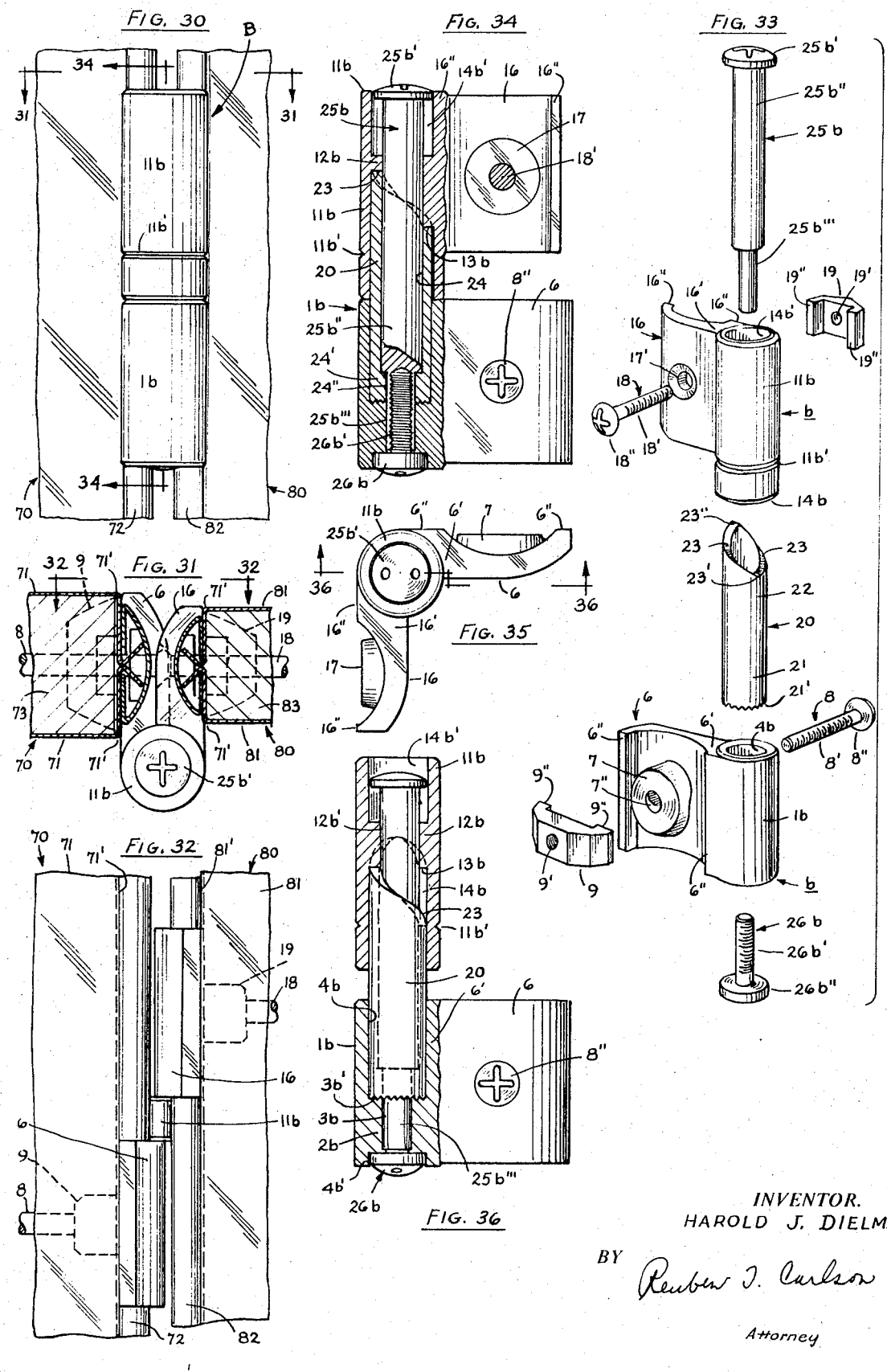

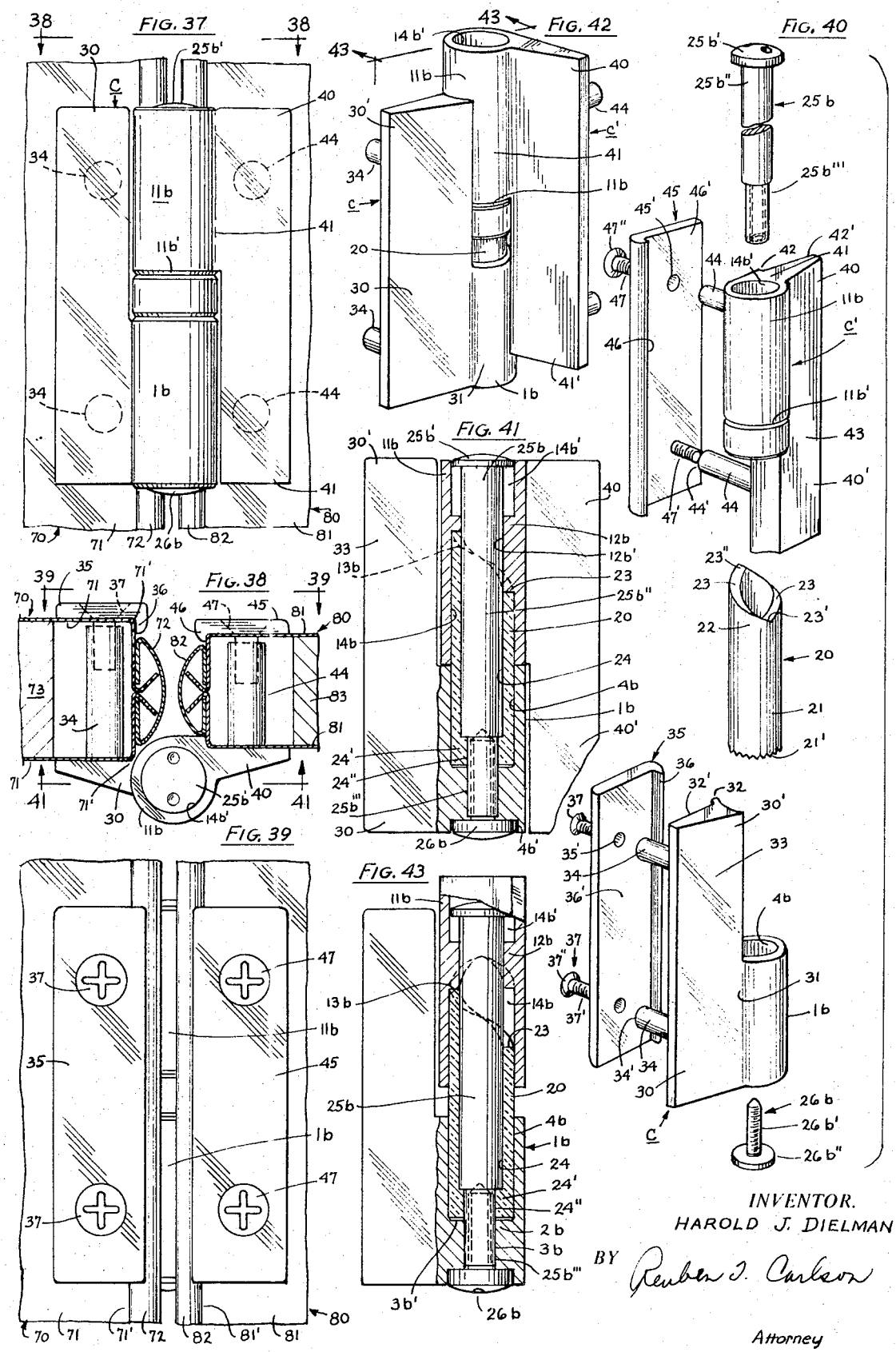

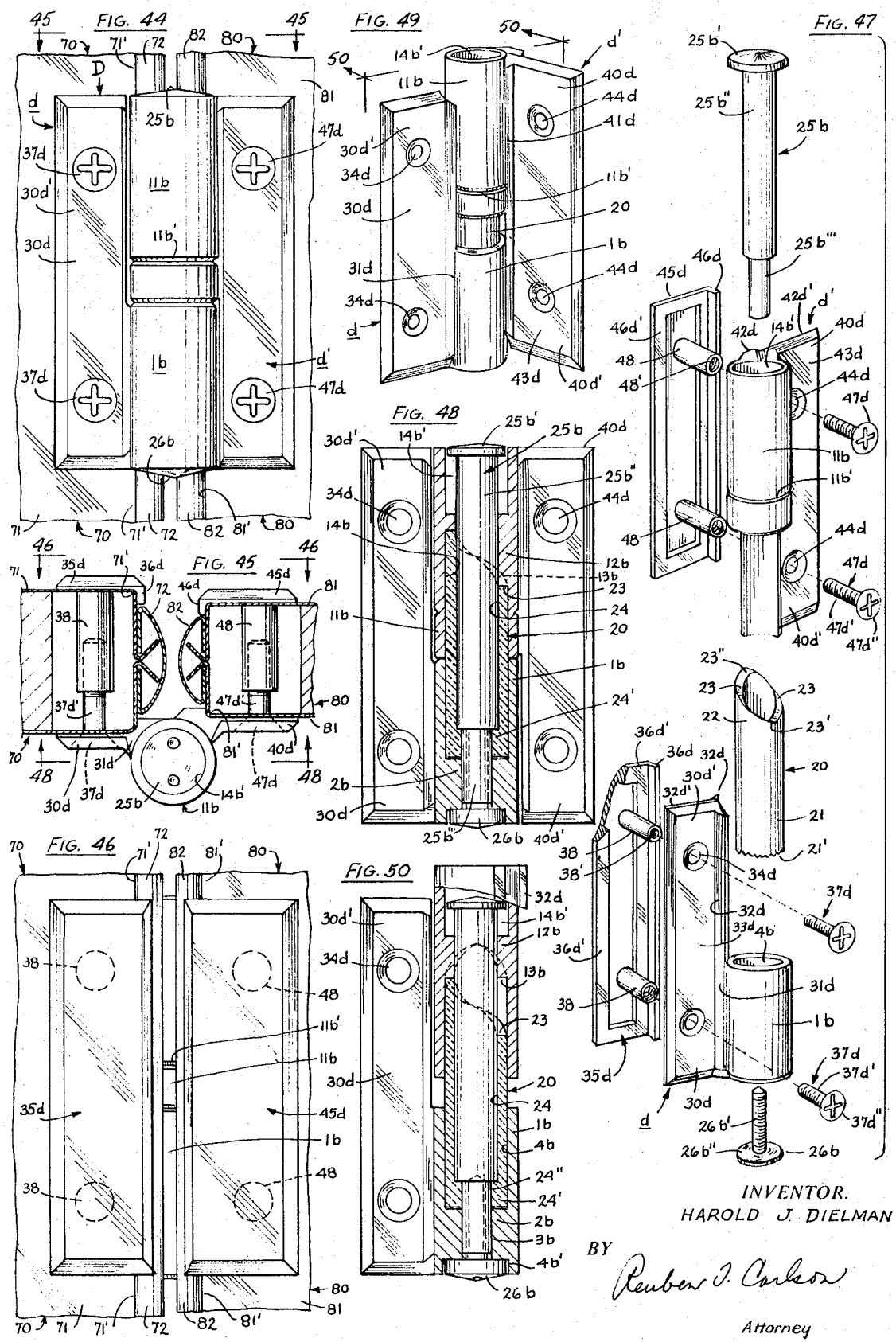

Dec. 8, 1970 H. J. DIELMAN 3,545,032
CAM OPERATED HINGE ASSEMBLIES
Original Filed Jan. 18, 1965 8 Sheets-Sheet 7
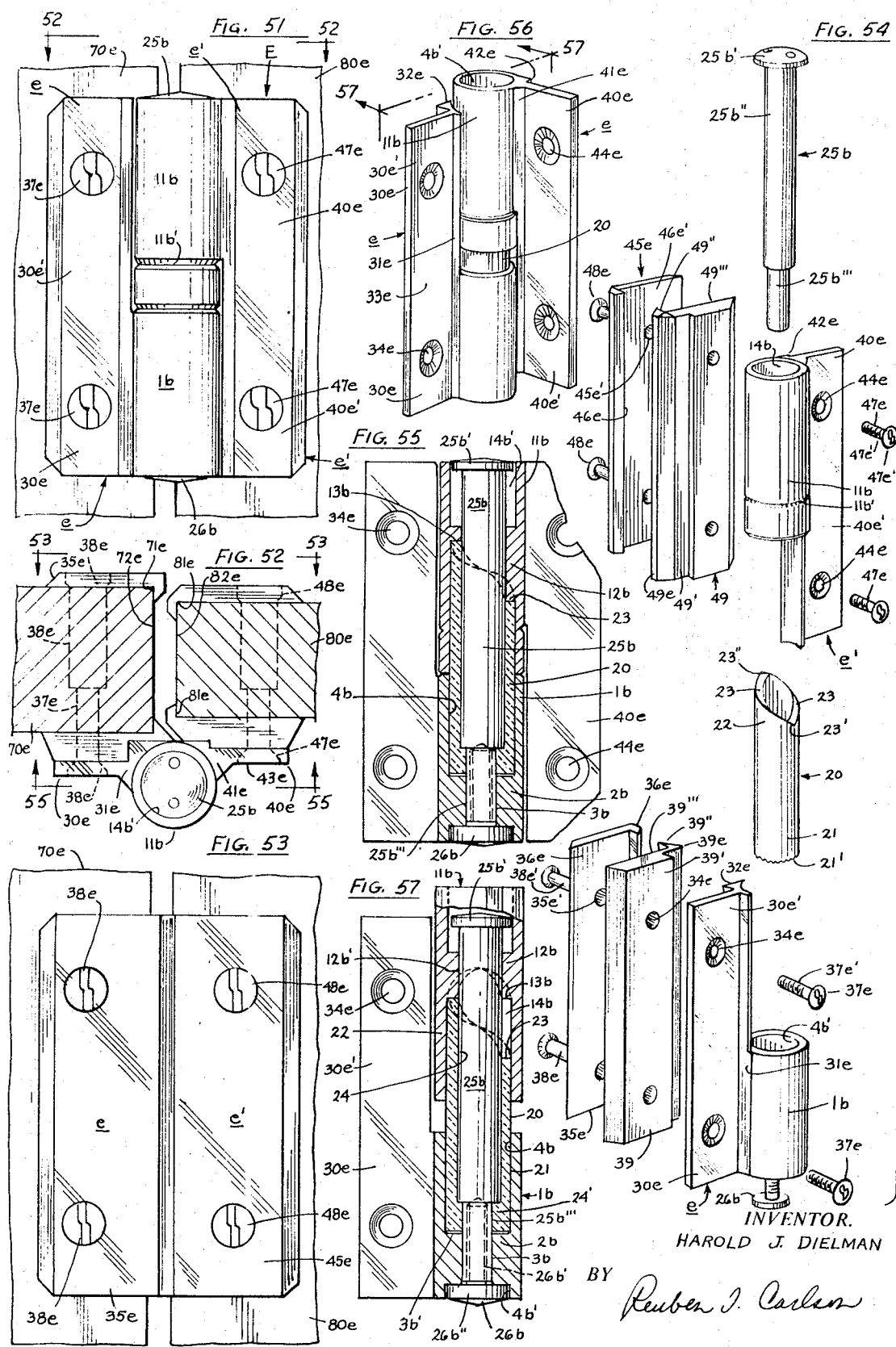
INVENTOR.
HAROLD J. DIELMAN
BY
Reuben I. Carlson
Attorney

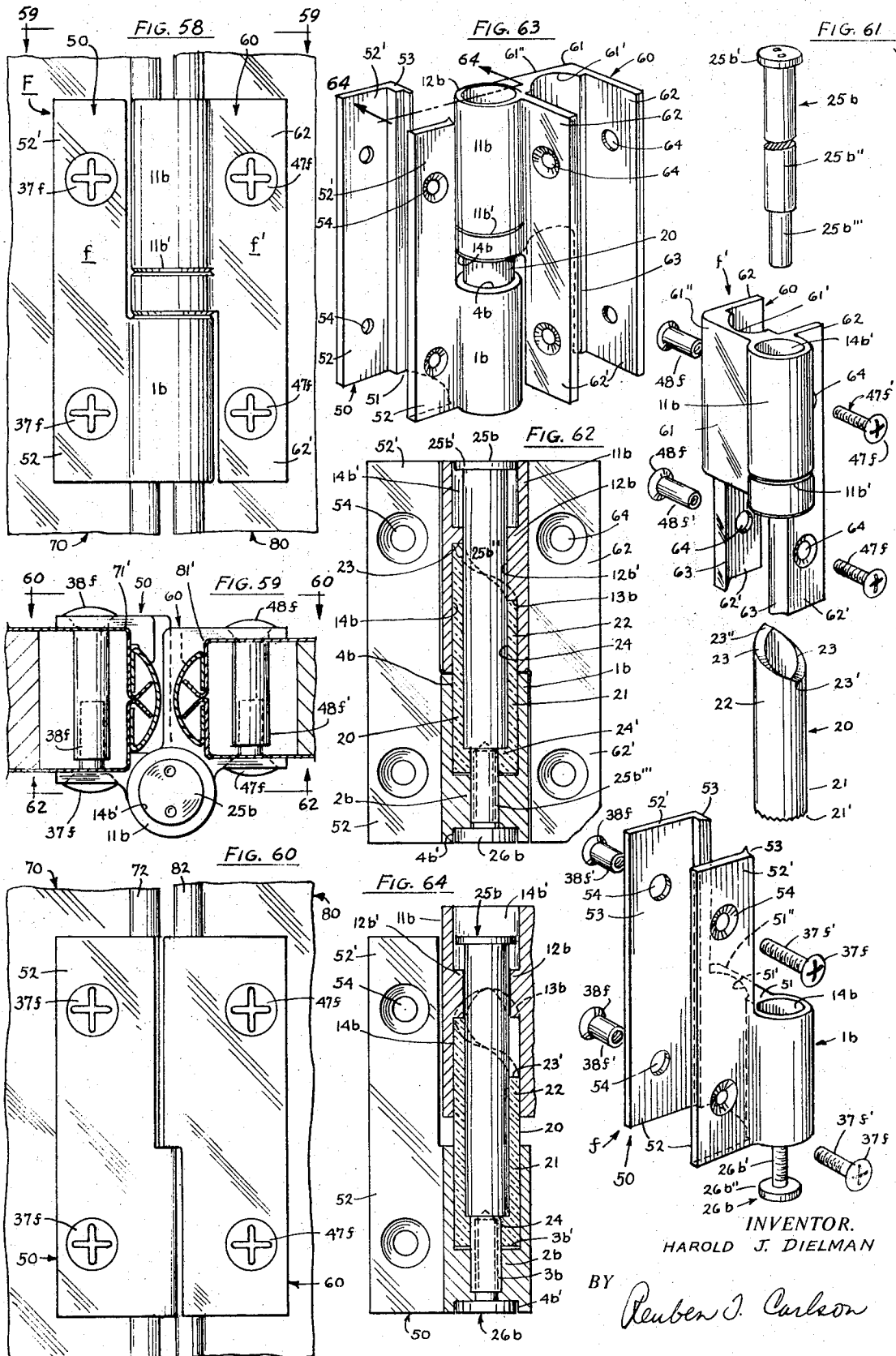

United States Patent Office 3,545,032
Patented Dec. 8, 1970

3,545,032
CAM OPERATED HINGE ASSEMBLIES
Harold J. Dielman, Lyndhurst, Ohio, assignor to The Sanymetal Products Company, Inc., Cleveland, Ohio, a corporation of Ohio
Continuation of application Ser. No. 426,246, Jan. 18, 1965. This application Apr. 17, 1969, Ser. No. 830,175
Int. Cl. E05d 5/10; E05f 1/06
U.S. Cl. 16—153                                18 Claims

ABSTRACT OF THE DISCLOSURE

The present disclosure relates to a gravity hinge and more particularly to a hinge or hinge parts which are designed so as to satisfy both right and left hand swinging door conditions. In one embodiment the hinge part attached to the supporting frame and the hinge part attached to the door each have symmetrical supporting sleeves which present similar cam receiving pockets at opposite ends thereof which are generally defined on the opposite sides of a medial internal boss, the sleeve of the supported hinge part presenting similar riding cam tracks on opposite sides of the boss adapted to engage a cylindrical stationary cam member secured in the sleeve of the supporting hinge part. Characteristic of each of the hinge embodiments disclosed herein is that the stationary cylindrical cam member and hinge pintle are so designed as to journal the supported hinge part attached to the door regardless of whether a right or left hand hinge assembly is contemplated.

---

This application is a continuation of copending application Ser. No. 426,246, filed Jan. 18, 1965, and now abandoned.

Cam operated hinge assemblies made in accordance with this invention are particularly designed for exterior application to relatively thin door bodies and doorframe members or pilasters having a thickness in the order of one to two inches, and forming component parts of interior space dividing compartments and cubicles. In such installations, the doorframe members or pilasters may be fixed to the building floor and/or building ceiling, and the door bodies positioned therebetween are usually spaced twelve or more inches from the building floor to facilitate floor cleaning. Such door bodies may be advantageously mounted for smooth and substantially frictionless swinging movement to and from a predetermined residence position by the use of upper and lower hinge assembles constructed and mounted on the door body and adjacent doorframe member in accordance with this invention.

The hinge assembly of this invention generally embraces a supporting hinge part having a sleeve section in which the base portion of a stationary cam member is pocketed, and an attaching section extending laterally from the supporting sleeve and designed for securement to the jamb face or a side face of a doorframe member. The cam member is preferbly formed from a tough and wear-resistant plastic compound having a low coefficient of surface friction. The upper portion of the cam member is cylindrical in form, presents an inclined cam track at the upper end thereof, and is designed to be journalled within a cam receiving pocket presented by the riding sleeve of the swinging hinge part. The swinging hinge part presents an attaching section extending laterally from its riding sleeve and designed to be secured to the jamb edge or a side face of the door body to be swingably supported. The riding sleeve contains an internal boss whose end face presents a cam track which is complementary to and designed to ride on the cam track of the stationary cam member therebelow.

The supporting hinge parts of the similar upper and lower hinge assemblies may be applied by securing their attaching sections to the doorframe member or pilaster at the factory, or after erection of the doorframe member, but before the door body is mounted in the field. Likewise, the similar swinging hinge parts of the upper and lower hinge assemblies may be applied by securing their attaching sections to the door body at the factory and before the door is mounted in the field. The base portion of the stationary cam member may be inserted into the receiving pocket of each supporting sleeve at the factory or in the field. The door body may then be mounted in the field by telescoping the cylindrical upper portions of the cam members into the journal forming pockets of the upper and lower riding sleeves as secured by their associated attaching sections to the door body.

A hinge pintle is downwardly inserted through an axial bore formed in the internal boss of each riding sleeve, and into a bore formed in the stationary cam member therebelow, which is in axial alignment with the bore extending through the boss portion of the riding sleeve. The pintle receiving bore in each cam member terminates in an internal shoulder which provides a supporting seat for the lower end portion of the hinge pintle. The threaded shank portion of an assembly bolt or screw is inserted through an axial bore formed in an internal supporting boss of the stationary sleeve on which the lower end of the cam member is seated, thence through an axial bore formed in the seating shoulder of the cam member, and then threadably secured to the internally threaded lower end portion of the hinge pintle. The head portion of the assembly screw is pocketed within the lower end of the supporting sleeve and is externally accessible for convenient manipulation.

When the applied assembly screw is relatively loose, the cam member may be rotated to orient the valley point and crown point of its cam track clockwise or counterclockwise to thereby establish the desired residence position of the hung door body. The head portion of the assembly screw may then be externally manipulated by means of a suitable tool to fix the oriented position of the cam member, and also rigidly secure the lower end of the hinge pintle to the supporting sleeve. The upper end of the hinge pintle is provided with an abutment head which telescopes within a pocket formed in the upper end of the riding sleeve and serves to limit the vertical movement of the riding sleeve and the door body to which it is attached, and additionally maintains the swinging hinge part and the supporting hinge part in proper assembled relation.

The attaching section of the supporting hinge part and the attaching section of the riding hinge part may be made in various forms as desired. In one form of this invention, the attaching section of the supporting hinge part may comprise a saddle which may be formed integral with the supporting sleeve and designed to snugly seat against the outer face of a hollow doorframe member or pilaster. The inner face of the saddle also presents a circular supporting boss designed to project into a conforming hole provided in the jamb face of the doorframe member. The shank portion of a securing bolt is telescoped through a medial hole formed in the supporting saddle and a clamp block is applied to the threaded end thereof. The clamp block and the shank portion of the securing bolt are so designed as to permit tilting insertion thereof through the conforming hole formed in the hollow doorframe member, to thereby place the clamp block within the doorframe member. External manipulation of the exposed head portion of the securing bolt serves to draw the clamp block into seating abutment against the spaced inner surface of the doorframe member and thus rigidly secure the supporting hinge part to the doorframe member. The attaching section of the riding hinge part may be similarly constructed to provide a saddle formed integral with and extending laterally from its riding sleeve and which is designed to be applied to the jamb face of the door body and secured thereto by an associated securing bolt and clamp block.

In other forms of this invention, the attaching sections of the supporting hinge part and swinging hinge part may be constructed in the form of U-shaped brackets. The U-shaped bracket formed integral with and projecting laterally from the supporting sleeve is designed to be telescoped over and bolted to the side faces of the doorframe member or supporting pilaster; and a similar U-shaped bracket formed integral with and projecting laterally from the riding sleeve is designed to be telescoped over and bolted to the side faces of the door body.

In other forms of this invention, the attaching sections of the supporting hinge part and riding hinge part of each hinge assembly may present a pair of wing leafs formed integral with and projecting laterally from the supporting sleeve and riding sleeve and respectively designed to overlap a side face of the doorframe member and a side face of the door body. The wing leafs may be respectively bolted to the doorframe member and door body, with or without the use of backing plates respectively applied to the opposite side of the doorframe member and door body.

All of the attaching means of this invention present seating surfaces designed to snugly interfit with those areas of the doorframe member and door body to which they are to be applied, to thereby insure rigid securement.

In all the various forms of hinge assemblies made in accordance with this invention, the stationary cam member, hinge pintle and assembly screw are designed to provide standard components suitable for association with either right or left hand swinging doors, thus reducing the number of parts required to be carried in stock. Where the supporting hinge part and swinging hinge part of the hinge assembly are not truly symmetrical in form, a right and left hand supporting hinge part and a left and right hand swinging hinge part would be required to satisfy all door mounting conditions.

However, this invention also contemplates the provision of a singe set of components from which a hinge assembly can be made which satisfies both right hand and left hand door conditions. This is accomplished in accordance with this invention by providing a supporting hinge part having a symmetrical supporting sleeve which presents similar cam receiving pockets at opposite ends thereof which are defined on the opposite sides of a medial internal boss, and by providing an attaching section such as a supporting saddle formed integral with the supporting sleeve which is also symmetrical in shape and form. In the same way, the swinging hinge part may be designed to present a symmetrical riding sleeve having a medial internal boss whose opposite ends present complementary cam tracks which define similar cam receiving pockets at opposite ends of the riding sleeve, together with an attaching section such as a symmetrical saddle which is integral with and symmetrical to the riding sleeve. When so formed, the supporting hinge part can be reversed so that its symmetrical attaching section can be secured to either a right or left hand doorframe member, with either cam receiving pocket uppermost. Similarly, the swinging hinge part can be reversed and its attaching section secured to either a right or left hand door body, and in a manner to present either one of its two cam receiving pockets of its riding sleeve in a position to be telescoped over the stationary cam member projecting from the upper pocket of the supporting sleeve.

In hinge assemblies constructed in accordance with this invention, the riding sleeve of the door-attached swinging hinge part is doubly journalled for smooth and substantially frictionless rotation and vertical reciprocation; one journal being provided by the cam member whose lower end is rigidly secured to the supporting sleeve of the doorframe attached stationary hinge therebelow and whose upper cylindrical portion smoothly projects into the axially elongated cam receiving pocket of the riding sleeve; the other journal being provided by the cylindrical shank portion of the sturdy hinge pintle which smoothly telescopes through the axial bore presented by the internal cam track forming boss of the riding sleeve, and whose lower end is rigidly secured by the assembly screw to the assembly screw to the supporting sleeve of the doorframe attached stationary hinge part. Smooth and substantially frictionless swinging movement of the door body is thus assured.

Additionally, any desired residence position of the door body can be quickly and conveniently established by tool manipulation of the exposed head portion of the assembly screw. By loosening the assembly screw, the cam member as seated within the cam pocket of the supporting sleeve can be clockwise or counter-clockwise rotated to thereby orient the valley point of its cam track into radial alignment with the desired residual position of the door body. The assembly screw is then tightened to thereby draw the base end of the cam member into rigid frictional engagement with the adjacent face of the internal boss presented by the supporting sleeve, with resultant rigid securement of the cam member in its selected oriented position. Thus, any desired residence position of the door body with respect to the doorframe defined door opening, can be effected at any time during the life of the installation and while the door remains in mounted position.

Additionally, the abutment head at the upper end of the hinge pintle, prevents inadvertent and undesired lifting removal of the door body, and maintains the door body in its intended mounted position, and also limits the vertical movement of the riding sleeve and door body in a manner which fixes the maximum open position of the door body. The abutment head is shaped to be snugly contained within the conforming pocket provided in the upper end of the riding sleeve, and thus excludes the entry of dust and foreign matter into the pintle receiving bore and cam receiving pocket of the riding sleeve. The maximum open position of the door body may also be adjusted as desired by providing an abutment head which forms the head end of an adjusting screw, whose shank portion is adjustably threaded into a threaded bore formed on the upper end of the hinge pintle.

The hinge assemblies of this invention are so made that the supporting hinge part and riding hinge part thereof may be precision secured to the doorframe member and door body at the factory before shipment, or in the field as desired, followed by application of the stationary cam member, the hinge pintle and assembly screw thereto during the door mounting operation.

These hinge assemblies can be quickly assembled and applied to factory-made door bodies and pilasters, with accuracy and precision, in minimum time and with minimum assembly and installation labor.

These hinge assemblies are composed of relatively few parts which can be economically die cast, molded, stamped and/or machined to the required form, and which hinge components can be quickly assembled for mounting attachment to either right or left hand swinging doors. These hinge assemblies, constructed and installed in accordance with this invention, will withstand a lifetime of use and abuse, are attractive in appearance, and architecturally harmonious with the door bodies and door supporting frame members or pilasters with which they are associated.

Other objects and advantages of this invention will become apparent as the disclosure proceeds.

Although the characteristic features of this invention will be particularly pointed out in the claims, the invention itself, and the manner in which it may be made and used, may be better understood by referring to the following description taken in connection with the accompanying drawings forming a part hereof in which:

FIG. 1 is an elevational view of a partitioning cubicle having a pair of hinge assemblies made in accordance with this invention and surface mounted on the left hand side of its inwardly swinging door and adjacent pilaster, this view being taken along line 1—1 of FIG. 2;

FIG. 2 is a plan view of the partitioning cubicle and one of the associated surface mounted hinge assemblies of this invention as the same would appear when viewed along line 2—2 of FIG. 1, this view showing the spaced dividing partitions of the cubicle partly broken away and the door shown in phantom lines when swung inwardly;

FIG. 3 is an elevational view of a partitioning cubicle having a pair of hinge assemblies made in accordance with ths inventon mounted on the right hand side of its inwardly swinging door and adjacent pilaster, this view being taken along line 3—3 of FIG. 4;

FIG. 4 is a plan view of the partitioning cubicle and one of the associated surface mounted hinge assemblies of this invention as the same would appear when viewed along line 4—4 of FIG. 3, this view showing the spaced dividing partitions of the cubicle partly broken away and the door shown in phantom lines when swung inwardly;

FIG. 5 is substantially a full size elevational view of one of the hinge assemblies of this invention and adjacent fragmentary parts of the door body and supporting pilaster to which the hinge assembly is attached, this view taken along line 5—5 of FIG. 2;

FIG. 6 is a sectional view of one of the hinge assemblies of this invention as the same would appear when viewed along line 6—6 of FIG. 1, this view showing the manner in which the wing leafs of the hinge assembly may be secured to the left hand edge of the door body and the adjacent pilaster body;

FIG. 7 is a sectional view of one of the hinge assemblies of this invention as the same would appear when viewed along line 7—7 of FIG. 3, this view showing the manner in which the wing leafs of the hinge assembly may be reversed for securement to the right hand edge of the door body and the adjacent pilaster body;

FIG. 8 is an elevational view of the hinge assembly of this invention which shows an outside view of its upper wing leaf design for attachment to the jamb edge of a door body, and an inside view of its lower wing leaf designed for attachment to the jamb edge of a supporting pilaster;

FIG. 9 is another elevational view of the hinge assembly of this invention which shows an inside view of its upper wing leaf designed for attachment to the jamb edge of a door body, and an outside view of its lower wing leaf designed for attachment to the jamb edge of a supporting pilaster;

FIG. 10 is a vertical section of the hinge assembly as the same would appear when viewed along line 10—10 of FIG. 9;

FIGS. 11, 12, 13 and 14 are transverse sectional views of the hinge assembly showing various parts thereof as they would appear when viewed in the direction of the arrows along line 11—11, line 12—12, line 13—13 and line 14—14 of FIG. 10;

FIG. 15 is a perspective view of the component parts of the hinge assembly of this invention is exploded relation;

FIG. 16 is a perspective view of the reversible door applied part of this hinge assembly and which shows an inside view of its door applied wing leaf and a sectional view of its riding sleeve and the cam elements formed therein;

FIG. 17 is a perspective view partly in section of the cam cylinder which forms a component part of this hinge assembly;

FIG. 18 is a perspective view of the reversible pilaster applied part of this hinge assembly and which shows an outside view of its pilaster applied wing leaf and a sectional view of its sleeve which provides support for the cam cylinder shown in FIG. 17;

FIG. 19 is a plan view of the reversible pilaster applied part of this hinge assembly, including the clamp screw applied to its pilaster attachable wing leaf or saddle, and the associated clamp block in exploded relation thereto;

FIG. 20 is a perspective view of the hinge pintle which forms a component part of this hinge assembly, and a guide cylinder in exploded relation to the hinge pintle and which may be substituted for the cam cylinder shown in FIG. 17, when it is desired to convert this hinge assembly from a gravity operated hinge as shown in FIGS. 10 and 15 to a nongravity operated hinge assembly, as shown in FIGS. 26 and 28;

FIG. 21 is an elevational view partly in section of the hinge pintle and guide cylinder shown in FIG. 20 as they would appear when in assembled relation;

FIG. 22 is an elevational view, partly in section, of the hinge assembly of this invention and which incorporates a cam cylinder for gravity operation, this view showing the relative position of the component parts of the hinge assembly as viewed along line 22—22 of FIG. 23 and as the parts would appear when the door to which the hinge assembly is applied is in closed or residence position;

FIG. 23 is a transverse section of the hinge assembly as the same would appear when viewed along line 23—23 of FIG. 22, this view also showing fragmentary portions of the door body and adjacent pilaster body and the relative position of certain parts of the hinge assembly when the door is in closed or in residence position;

FIG. 24 is an elevational view, partly in section, of the hinge assembly shown in FIG. 22 but as the same would appear when viewed along the line 24—24 of FIG. 25, this view showing the relative position of the cam cylinder and other component parts of the hinge assembly when the door to which the hinge assembly is applied is in opened position;

FIG. 25 is a transverse section of the hinge assembly as the same would appear when viewed along line 25—25 of FIG. 24, this view also showing fragmentary portions of the door body and adjacent pilaster body and the relative position of certain parts of the hinge assembly when the door is in opened position;

FIG. 26 is an elevational view, partly in section, of a hinge assembly which incorporates a guide cylinder rather than a cam cylinder and thus may be paired for use with the gravity operated hinge assembly illustrated in FIGS. 22–25, this view showing the relative position of the guide cylinder and other component parts of the hinge assembly as viewed along line 26—26 of FIG. 27 and as the parts would appear when the door to which this hinge assembly is applied in closed or residence position;

FIG. 27 is a transverse section of this hinge assembly as the same would appear when viewed along line 27—27 of FIG. 26, this view also showing fragmentary portions of the door body and adjacent pilaster body and the relative position of the parts of this hinge assembly when the door is in closed or residence position;

FIG. 28 is an elevational view, partly in section, of the hinge assembly shown in FIG. 26 but as the same would appear when viewed along line 28—28 of FIG. 29, this view showing the relative position of the guide cylinder and other component parts of the hinge assembly when the door to which the hinge assembly is applied is in opened position;

FIG. 29 is a transverse section of the hinge assembly as the same would appear when viewed along line 29—29 of FIG. 28, this view also showing fragmentary portions of the door body and adjacent pilaster body and the relative position of certain parts of this hinge assembly when the door is in opened position;

FIG. 30 is an elevational view of a modified form of a gravity operated hinge assembly made in accordance with this invention, this view also showing adjacent fragmentary parts of the door body and supporting pilaster to which this hinge assembly is attached;

FIG. 31 is a top plan view of the modified hinge assembly as the same would appear when viewed along line 31—31 of FIG. 30, this view also showing the manner in which the wing leafs of the modified hinge assembly may be secured to the adjacent edges of the door body and pilaster body;

FIG. 32 is an elevational view of the modified hinge assembly shown in FIGS. 30 and 31 as the same would appear when viewed in the direction of the arrows along line 32—32 of FIG. 31, this view showing further details of the means which may be employed for securing the wing leafs of the hinge assembly to the adjacent vertical edges of the door body and pilaster body;

FIG. 33 is a perspective view of the component parts of the modified hinge assembly in exploded relation;

FIG. 34 is an elevational view, partly in section, of the modified hinge assembly of this invention as the same would appear when viewed along line 34—34 of FIG. 30, this view showing the relative position of the cam cylinder and other component parts of this hinge assembly when the door to which the hinge assembly is applied is in closed or residence position;

FIG. 35 is a plan view of the modified hinge assembly as it would appear when in open position and unattached to the door body and pilaster body;

FIG. 36 is an elevational view, partly in section, of the modified hinge assembly shown in FIG. 34 as the same would appear when viewed in the direction of the arrows along line 36—36 of FIG. 35, this view showing the relative position of the cam cylinder and other component parts of this hinge assembly when the door to which the same is applied is in open position;

FIG. 37 is an elevational view of a further modified form of gravity operated hinge assembly made in accordance with this invention, this gravity operated hinge assembly having wing leafs designed to be mounted on the adjacent side faces of the door body and pilaster body, only fragmentary parts of the door and pilaster bodies being shown in this figure;

FIG. 38 is a top plan view of the modified gravity operated hinge assembly as the same would appear when viewed along line 38—38 of FIG. 37, this view showing backing plates and associated means for securing the wing leafs of the hinge assembly to the door and pilaster bodies;

FIG. 39 is an elevational view of the modified hinge assembly shown in FIGS. 37 and 38 as the same would appear when viewed in the direction of the arrows along line 39—39 of FIG. 38, this view illustrating further details of the backing plates and associated means which secure the wing leafs of this hinge assembly to the door and pilaster bodies;

FIG. 40 is a perspective view of the component parts of this modified hinge assembly shown in exploded relation;

FIG. 41 is an elevational view, partly in section, of the modified gravity operated hinge assembly assembled from the component parts shown in FIG. 40 and as the same would appear when viewed along line 41—41 of FIG. 38, this view showing the relative position of the cam cylinder, and other component parts of this hinge assembly when in closed door position;

FIG. 42 is a perspective view of this modified gravity operated hinge assembly as the same would appear when in open door position;

FIG. 43 is an elevational view, partly in section, of the modified hinge assembly as the same would appear when viewed in the direction of the arrows along line 43—43 of FIG. 42, this view showing the relative position of the cam cylinder and other component parts of this hinge assembly when in open door position.

FIG. 44 is an elevational view of a gravity operated hinge assembly made in accordance with this invention which is generally similar to the modified hinge assembly shown in FIG. 37, except for certain modifications in its wing leafs and associated means for securing the same to the adjacent side faces of the door body and pilaster body, fragmentary parts only of the door and pilaster bodies being here shown;

FIG. 45 is a top plan view of this gravity operated hinge assembly as the same would appear when viewed along line 45—45 of FIG. 44, this view showing the backing plates and associated means for securing the wing leafs of the hinge assembly to the door body and pilaster body;

FIG 46 is an elevational view of the modified hinge assembly shown in FIGS. 44 and 45 as the same would appear when viewed in the direction of the arrows along line 46—46 of FIG. 45, this view illustrating further details of the backing plates and associated means which secure the wing leafs of this hinge assembly to the door and pilaster bodies;

FIG. 47 is a perspective view of the component parts of this modified hinge assembly and associated backing plates as the same would appear in exploded relation;

FIG. 48 is an elevation view, partly in section, of this modified gravity operated hinge assembly composed of the component parts shown in FIG. 47 and as the same would appear when viewed along line 48—48 of FIG. 45, this view showing the relative position of the cam cylinder and other component parts of this hinge assembly when the door to which the same is applied as in the closed position shown in FIG. 45;

FIG. 49 is a perspective view of this modified gravity operated hinge assembly as the same would appear when in open door position;

FIG. 50 is an elevational view, partly in section, of this modified hinge assembly as the same would appear when viewed in the direction of the arrow along line 50—50 of FIG. 49, this view showing the relative position of the cam cylinder and other component parts of this hinge assembly when the same is in open door position;

FIG. 51 is an elevational view of a gravity operated hinge assembly made in accordance with this inventtion which is generally similar to the modified hinge assembly shown in FIG. 44, except for modifications in its wing leafs and associated means for securing the same to the adjacent side faces of square-edged door and pilaster bodies, fragmentary parts only of the door and pilaster bodies being here shown;

FIG. 52 is a top plan view of this gravity operated hinge assembly as the same would appear when viewed along line 52—52 of 51, this view showing the filler plates, backing plates and associated means for mounting and securing the wing leafs of this hinge assembly to the square-edged door and pilaster bodies;

FIG. 53 is an elevational view of the modified hinge assembly shown in FIGS. 51 and 52 as the same would appear when viewed in the direction of the arrows along line 53—53 of FIG. 52, this view illustrating further details of the backing plates which contribute to the securement of the wing leafs of this hinge assembly to the door and pilaster bodies:

FIG. 54 is a perspective view of the component parts of this modified hinge assembly and associated filler and backing plates as the same would appear in exploded relation;

FIG. 55 is an elevational view, partly in section, of this modified gravity operated hinge assembly composed of the component parts shown in FIG. 54 and as the same would appear when viewed along line 55—55 of FIG. 52, this view showing the relative position of the cam cylinder and other component parts of this hinge assembly when the door to which the same is applied is in the closed position shown in FIG. 53;

FIG. 56 is a perspective view of this modified gravity operated hinge assembly as the same would appear when in open door position;

FIG. 57 is an elevational view, partly in section, of this modified hinge assembly as the same would appear when viewed in the direction of the arrows along line 57—57 of FIG. 56, this view showing the relative position of the cam cylinder and other component parts of this hinge assembly when the same is in open door position;

FIG. 58 is an elevational view of a further form of gravity operated hinge assembly made in accordance with this invention, which is generally similar to the modified hinge assembly shown in FIGS. 44, 45 and 46, except that its attaching wings are in the form of U-shaped saddle sections designed to be telescopically applied and secured to the adjacent edges of the door body and pilaster body, fractional parts of the door and pilaster bodies being here shown;

FIG. 59 is a top plan view of this gravity operated hinge assembly as the same would appear when viewed along line 59—59 of FIG. 58, this view showing the saddle sections of this hinge assembly telescopically applied and secured to adjacent vertical edges of the door body and pilaster body;

FIG. 60 is a substantially full size elevational view of the modified hinge assembly shown in FIGS. 58 and 59 as the same would appear when viewed in the direction of the arrows along line 60—60 of FIG. 59, this view illustrating further details of the saddle sections and associated means which secure this hinge assembly to the door body and pilaster body;

FIG. 61 is a perspective view of the component parts of this modified hinge assembly as the same would appear in exploded relation;

FIG. 62 is an elevational view, partly in section, of this modified gravity operated hinge assembly composed of the component parts shown in FIG. 61 and as the same would appear when viewed along line 62—62 of FIG. 59, this view showing tthe relative position of the cam cylinder and other component parts of this hinge assembly when the door to which the same is applied is in the closed position shown in FIG. 59;

FIG. 63 is a perspective view of this modified gravity operated hinge assembly as the same would appear when in open door position; and FIG. 64 is an elevational view, partly in section, of this modified hinge assembly as the same would appear when viewed in the direction of the arrows along line 64—64 of FIG. 63, this view showing the realtive position of the cam cylinder and other component parts of this hinge assembly when the same is in open door position.

Similar reference numerals refer to similar parts throughout the specification and the drawings.

Cam operated hinge assemblies constructed in accordance with this invention, can be made in any desired size and adapted to swingably support hollow metal or solid doors of any size and form. However, these hinge assemblies find particular application to doors and pilasters of interior compartments and cubicles, and whose door bodies and associated door supporting frame members or pilasters are in the order of one to two inches in thickness. As an illustration, there is shown in FIGS. 1 to 7 inclusive, a door body 80 having a thickness of approximately one inch, fitted within a door opening defined between a pair of spaced doorframe members or pilasters 70—70′ which have a thickness in the order of about one and one half inches, and wherein the door body 80 is shown swingably supported from one of the doorframe members 70 by a pair of upper and lower hinge assemblies A constructed in accordance with one exemplification of this invention. In such compartments or cubicles, a dividing partition 75 is secured to and extends between each of the door framing pilasters 70 and 70′ and the adjacent interior building wall. Each of the pilasters 70 and 70′ is rigidly secured at the lower end and/or the upper end thereof to the building floor and/or building ceiling by strong and sturdy anchoring means, and the anchoring means are concealed by a tubular shoe 74 which is telescoped over the doorframe member or pilaster and seated against the building floor and/or building ceiling.

Each of the spaced doorframe members 70 and 70′ is commonly formed from a pair of spaced sheet metal facing pans 71—71 presenting paired inturned flanges extending along three edges thereof, and which are interlocked together by semitubular edging strips as shown in FIGS. 6 and 7. Each hollow metal pilaster may contain a sound insulating and reinforcing core 73. As thus formed, the jamb edge of the door supporting frame member or pilaster 70 thus presents spaced corner portions 71′—71′ joined by a crown edge portion 72 to which the attaching section of the supporting hinge part shall conform. The door supporting frame member or pilaster 70 may otherwise be formed as a hollow metal tube which presents either a flat jamb edge or a jamb edge which presents spaced corner portions 71′—71′ joined by a crowned edge portion 72 as indicated.

The door body 80 is also presently constructed from a pair of wall-forming facing pans 81—81 presenting paired inturned flange portions which are interlocked together by semitubular edging strips along all four edges thereof, thereby providing a hollow metal door body which may contain a sound insulating and reinforcing core 83. The jamb edge of the door body, where the attaching sections of the riding hinge parts of the upper and lower hinge assemblies are to be applied, would thus present spaced corner portions 81′—81′ joined by a crown edge portions 82 to which the door-attaching sections of the riding hinge parts should conform.

In such cubicle and compartment installations, the upper and lower hinge assemblies should be so constructed as to permit swinging movement of the door body in a left hand or right hand direction, and to swing into the compartment or cubicle, or to swing exteriorly of the compartment or cubicle, as selectively desired. Since the lower end of the door body is normally spaced from the building floor, there is no obstruction to vertical movement of the door body as it swings to and from closed or adjusted residence position. The various forms of cam operated hinge assemblies of this invention, illustrated in the accompanying drawings and designated as types A, B, C, D, E and F, are designed and adapted for application to either right or left hand swinging doors as illustrated in FIGS. 1–4. All of these hinge assemblies are provided with cam members which can be easily adjusted after the door body is swingably mounted, to establish any desired residence position of the mounted door body, as for example, the closed position shown in full lines in FIGS. 2 and 4. These hinge assemblies can be further adjusted to establish the maximum open position for the mounted door, as indicated for example by the phantom lines in FIGS. 2 and 4. These hinge assemblies are further provided with attaching sections designed to smoothly interfit with, and be rigidly secured to, the hinging edges of the door body and doorframe member, whatever their shape and form.

The hinge assembly A, as illustrated in FIGS. 8–29, comprises a supporting hinge part $a$ designed for attachment to a doorframe, post or pilaster 70′; and a swinging hinge part $a'$ normally positioned above the supporting hinge part $a$ and designed for attachment to a door body 80. The supporting hinge part $a$ generally comprises a supporting sleeve section 1 and a doorframe attaching section extending laterally therefrom; and the swinging hinge part $a'$ generally comprises a riding sleeve section 11 positioned above the supporting sleeve section 1 and a door body attaching section extending laterally therefrom.

The supporting sleeve section 1 is generally tubular in form and presents a transverse supporting wall 2 positioned intermediate the ends thereof. The intermediate transverse wall 2 defines complementary cam seating pockets 4 and 4′ at opposite ends thereof which are substantially similar in depth and in diameter. The internal supporting wall 2 presents a bore 3 extending axially therethrough, and serrated or friction seating faces 3' on opposite sides thereof.

Either one of the complementary cam seating pockets 4–4' of the supporting sleeve 1 is designed to receive the base portion 21 of a stationary cam member 20 whose end face 21' is serrated or roughened to frictionally engage the adjacent serrated face 3' presented by the internal supporting wall 2 of the supporting sleeve 1, as indicated in FIGS. 10, 13, 14, 15, 17 and 18. The stationary tubular cam member 20 is preferably molded from a tough and wear-resistant plastic compound having a low coefficient of surface friction. The base portion 21 of the cam member 20 and the complementary cam seating pockets 4–4' of the supporting sleeve 1 may be either polygonal or cylindrical in form to provide a snug fitting seat for the base portion 21 of the cam member 20.

The cylindrical upper portion 22 of the stationary cam member 20 is designed to extend a substantial distance above the adjacent end of the supporting sleeve 1 when its base portion 21 is fully and snugly seated within one of the selected cam seating pockets 4 or 4', and the upper portion 22 presents a truly cylindrical outer surface which provides rotative support for the riding sleeve section 11 of the swinging hinge part a', as indicated in FIGS. 10, 22 and 24. The upper or outer end of the cylindrical portion 22 of the cam member 20 also presents a pair of complementary semicircular cam tracks 23 each approximately 180 degrees in radial extent, with the adjacent ends of the semicircular cam tracks 23 defining therebetween a valley point 23' and a crown point 23". A hinge pintle receiving bore 24 extends axially into a stationary cam member 20 for the greater part of its axial length, and terminates in an internal seating shoulder defined by an end boss 24' which has a reduced diameter bore 24" extending axially therethrough.

The riding sleeve section 11 of the swinging hinge part a' is substantially greater in axial length than the axial length of the supporting sleeve section 1, and presents an internal cam forming boss 12 positioned intermediate the ends thereof. The cam forming boss 12 defines complementary cam receiving pockets 14 and 14' at the opposite ends of the sleeve 1, and each pocket presents a cylindrical journal forming surface designed to snugly receive the upper cylindrical portion 22 of the stationary cam member 20. Each of the opposite ends of the internal boss 12 defines a pair of semicircular riding cam tracks 13 which are complementary to the semicircular cam tracks 23 presented by the stationary cam member 20. The internal cam forming boss 12 of the siding sleeve 11 has a hinge pintle receiving bore 12' extending axially therethrough as shown in FIGS. 10 and 11, designed to accurately align with the pintle receiving bore 24 in the cam member 20 when the cylindrical end portion 22 of the cam member receiving end pockets 14 or 14' of the riding sleeve 11.

The attaching section of the supporting hinge part a may comprise a saddle 6 extending laterally from the supporting sleeve 1 and joined thereto by a connecting neck 6' as shown in FIGS. 6, 7, 8, 9, 15 and 18. The saddle 6 presents an inner face conforming to the jamb edge of the doorframe member 70 to which it is to be attached, and presents a pair of spaced seating flanges 6" designed to seat snugly against the outer corner portions 71' of the doorframe member 70. The inner face of the saddle 6 also presents a rearwardly projecting supporting boss 7 preferably circular in form and designed to project into a correspondingly shaped hole formed in the crowned jamb edge portion 72 of the doorframe member 70 to provide hanging support for the supporting hinge part a, as shown in FIGS. 6 and 7. The saddle 6 may be cast or molded or otherwise formed as an integral part of the supporting sleeve 1, and when the supporting sleeve 1 is made relatively short in axial length, the saddle 6 may present symmetrical end extensions projecting beyond the connecting neck 6' to provide a study support for the sleeve 1, and door body to be swingably mounted thereon.

The attaching section also includes a clamp bolt 8, designed for insertion into and through a countersunk bolt receiving hole 7' extending medially through the saddle 6 and associated supporting boss 7. The clamp bolt 8 has a threaded shank portion 8' of substantial length as shown in FIG. 19, designed to be threaded into a threaded bore 9' extending axially through a clamp block 9. The clamp bolt 8 has a tapered head portion 8" designed to seat within the outer countersunk end of the hole 7' so that the outer face of the head portion 8" when fully seated is substantially flush with the outer face of the saddle 6. The clamp block 9 is so shaped and formed as to permit tilted insertion thereof into the supporting hole provided by the jamb face of the doorframe member 70, when the clamp block 9 has been preapplied to the threaded shank portion 8' of the clamp bolt 8. The clamp block 9 presents a pair of spaced seating legs 9" designed to be drawn into abutment against the inner face of the corner forming portions 71'–71' of the doorframe member 70, as shown in FIGS. 6 and 7, by external manipulation of the head portion 8" of the clamp bolt 8.

The attaching section as thus formed, permits securement of the supporting hinge part a directly to the jamb edge of the doorframe member, with no part thereof in overlapped relation to the side faces of the doorframe member. It will, however, be appreciated that the supporting hinge part a may incorporate a wing leaf extending laterally from its supporting sleeve 1 which is designed for securement to a side face of the doorframe member.

The attaching section of the swinging hinge part a' may also comprise a saddle 16 extending laterally from the riding sleeve 11 and joined thereto by a connecting neck 16', as shown in FIGS. 6, 7, 8, 9, 15 and 16. The saddle section 16 presents an inner face conforming to the jamb edge of the door body 80 to which it is to be attached, and presents a pair of spaced seating flanges 16" designed to seat snugly against the outer corner portions 81'—81' of the door body 80. The inner face of the saddle 16 also presents a supporting boss 17 preferably circular in form, and designed to project into a correspondingly shaped conforming hole formed in the crowned jamb edge portion 72 of the door body 80 to provide hanging support for the riding hinge part a' as shown in FIGS. 6 and 7. The saddle part 16 may be cast, molded or otherwise formed as an integral part of the riding sleeve 11.

When the saddle 6 of the supporting hinge part a is made somewhat longer than its supporting sleeve 1, as illustrated in FIGS. 8 and 9, the saddle part 16 of the riding hinge part a' which is positioned above the supporting hinge part a' is made somewhat shorter than its associated riding sleeve 11, so that the saddle 16 will clear the saddle 6 when the complete hinge is applied to the doorframe member and door body. The saddle 16 is symmetrical in form and also symmetrical with respect to the riding sleeve 11 with which it is associated.

The attaching section also includes a clamp bolt 18, designed for insertion into and through a countersunk bolt receiving hole 17' extending medially through the saddle 16 and its associated supporting boss 17. The clamp bolt 18 has a threaded shank portion 18' of substantial length as shown in FIGS. 6 and 7, designed to be threaded into a threaded bore extending axially through a clamp block 19. The clamp bolt 18 has a tapered head portion 18" designed to seat within the outer countersunk end of the bolt hole 17; so that the outer face of the head portion 18' when fully seated, is substantially flush with the outer face of the saddle 16. The clamp block 19 is so shaped and formed as to permit tilted insertion thereof into the supporting hole provided in the jamb face of the door body, after the clamp block 19 has been preapplied to the threaded shank portion 18' of the clamp bolt 18. The clamp block 19 presents a pair of spaced seating legs 19" designed to be drawn into seating abutment against the inner corner forming portions 81'—81' of the door body 80 as shown in FIGS. 6 and 7 when the clamp bolt 18 is externally manipulated.

The attaching section as thus formed permits securement of the riding hinge part a' directly to the jamb edge of the door body, with no part thereof in overlapping relation to the side faces of the door body. It will, however, be appreciated that the attaching saddle 16 of the riding hinge part a' may be replaced by a wing leaf extending laterally from its riding sleeve 11, and which is designed for securement to a side face of the door body.

The riding hinge part a' is operatively connected to the supporting hinge part a by a hinge pintle 25 which telescopes through the pintle receiving bore 12' of the riding sleeve 11 and into the pintle receiving bore 24 of the stationary cam member 20, as illustrated in FIGS. 10, 22 and 24. One end of the cylindrical hinge pintle 25 is designed to seat on the internal shoulder defined by the end boss 24' of the stationary cam member 20, and the lower end of the pintle 25 is secured to the supporting sleeve 1 by an assembly bolt or screw 26 whose threaded shank portion 26' extends through the axial bore 3 of the internal supporting wall 2 of the supporting sleeve 1, through the reduced diameter bore 24" of the stationary cam member 20, and into the internally threaded bore 25' formed in the adjacent end of the cylindrical hinge pintle 25. The head portion 26" of the bolt or screw 26 is designed to seat against the outer face of the internal supporting wall 2 of the supporting sleeve 1.

When the assembly bolt or screw 26 is thus applied to the lower end of the hinge pintle 25, the serrated end face 21' of the cam member 20 may be drawn into rigid seating engagement against the adjacent serrated face 3' of the internal supporting wall 2 of the supporting sleeve 1, to thereby rigidly secure the cam member 20 and the lower end of the hinge pintle 25 to the supporting sleeve. By loosening the lower assembly screw 26, the cam member 20 may be rotated to selectively orient its cam tracks 23 to a position which will fix the residence position of the swinging door body with respect to the doorframe member on which it is hung.

As thus assembled, the riding sleeve 11 is rotatably journaled on the hinge pintle 25 extending through the journal forming bore 12' thereof, and yet permits vertical movement of the riding sleeve with respect to the cylindrical upper portion 22 of the cam member 20 as the internal cam track 13 presented by the riding sleeve 11 rides on the cam track 23 of the cam member 20. To present inadvertent removal of the riding sleeve 11 from its journaled position on the upper portion of the hinge pintle 25, the upper end of the hinge pintle 25 may also be provided with an internally threaded bore 25' which receives the shank portion 26' of an upper assembly screw or bolt 26 which may be similar to the lower assembly screw or bolt 26. The head portion 26" of the upper assembly screw 26 provides an overhanging abutment designed to abut against the upper end of the internal cam forming boss 12 of the riding sleeve 11, and which thereby limits the upward vertical movement of the riding sleeve 11 on the fixed hinge pintle 25 and on the cylindrical portion 22 of the stationary cam member 20 therebelow.

The exterior ends of the supporting sleeve 1 and riding sleeve 11 may be closed and given a finished appearance by similar closure caps 27 each of which presents a body portion 28 designed to be snugly telescoped into the lowermost external pocket 4 or 4' of the stationary sleeve 1 and the uppermost external pocket 14 or 14' of the riding sleeve 11. The closure caps 27 also present overhanging rim portions 28' designed to overlap the adjacent external ends of the supporting sleeve 1 and riding sleeve 11, and the inner face of the tubular body 28 thereof may be formed to provide a pocket 27' for the reception of the head portion 26" of the adjacent assembly screw 26.

Since the supporting hinge part a is completely symmetrical in form, it may be vertically reversed to place its saddle section 6 on either side of its riding sleeve 11. Thus the supporting hinge part a may be attached to a doorframe member 70 positioned on the left hand side of the hinge assembly as shown in FIG. 6, or on the right hand side of the hinge assembly as shown in FIG. 7. This is made possible because the saddle section 6 as well as the supporting sleeve 1 of the supporting hinge part a are both completely symmetrical in form and because the sleeve 1 presents similar cam receiving pockets 4 and 4' either of which may be placed uppermost to receive the base portion 21 of the stationary cam member 20.

Likewise, the saddle section 16 and the riding sleeve 11 of the swinging hinge part a' are symmetrical in form and symmetrical to each other, so that the swinging hinge part a' may be reversed to present its saddle section 16 in position for attachment to a door body 80 positioned on the right hand side of the door supporting frame member 70 as shown in FIG. 6, or for attaching to a door body 80 positioned on the left hand side of the door supporting frame member 70 as shown in FIG. 7. Since the cam receiving pockets 14 and 14' and associated riding cam tracks 13 of the riding sleeve 11 are similar and complementary in form, the cylindrical end portion 22 of the stationary cam member 20 may be inserted into either cam receiving pocket 14 or 14' and operative to provide riding support for the upper swinging hinge part a' and the door body attached thereto.

It will thus be noted that the supporting hinge part a and the swinging hinge part a' of the hinge assembly A are universally applicable to all swinging door conditions without change or modification; and since the hinge pintle 25 and associated assembly screws 26 applied to the ends thereof, as well as the stationary cam member 20, may be universally assembled to the supporting hinge part a and swinging hinge part a' to provide a hinge assembly A which will satisfy all swinging door conditions, a minimum number of identical components can be carried in stock.

The component parts of the hinge assembly A which are shown in exploded relation in FIG. 15, are assembled into a unitary structure by inserting the base portion 21 of the cam member 20 into the selected pocket 4 or 4' of the supporting sleeve 1, inserting the cylindrical hinge pintle 25 into the axial bore 24 of the cam member 20, and inserting the cylindrical hinge pintle 25 into the axial bore 24 of the cam member 20, and inserting the shank portion 26' of one of the end assembly screws 26 through the axial bore 3 of the internal supporting wall 2 of the supporting sleeve 1, through the reduced diameter bore 24" of the cam member 20, and into the threaded end bore of the hinge pintle 25; thereby assembling the hinge pintle 25 and cam member 20 to the supporting sleeve 1 of the supporting hinge part a.

The riding sleeve 11 of the swinging hinge part a' is then telescoped over the upper portion of the hinge pin 25 and the projecting cylindrical portion 22 of the cam member 20, so that the upper end portion of the hinge pintle 25 projects through the axial bore 12' presented by the internal cam forming boss 12 of the riding sleeve 11, and so that the cylindrical upper portion 22 of the cam member 20 is journaled within the adjacent cylindrical pocket 14 or 14' of the riding sleeve 11, and with one of the stationary cam tracks 23 presented by the upper end of the cam member 20 in tracking engagement with the adjacent riding track 13 presented by the internal boss 12 of the riding sleeve 11, as illustrated in FIG. 10. The companion assembly screw 26 is then applied to the internally threaded upper end of the hinge pintle 25.

The supporting hinge part a is further assembled by inserting the shank portion 8′ of the clamp bolt 8 into the saddle 6 and applying the clamp block 9 to the threaded shank portion 8′ of the clamp bolt. The riding hinge part a′ is further assembled by inserting the shank portion 18′ of the clamp bolt 18 into the saddle 16, and applying the clamp block 19 to the threaded shank portion 18′ thereof. As thus assembled, the hinge assembly A is ready for application to the jamb edge of the door body 80 and the jamb edge of the doorframe member 70 or pilaster. Alternatively, the saddle 6 of the supporting hinge part a may be secured to the jamb edge of the doorframe member 70, and the saddle 16 of the riding hinge part a′ may be secured to the jamb edge of the door body 80, before the stationary cam member 20, hinge pintle 25, and assembly screws 26, are applied to the parts a and a′.

The saddle section 6 may be secured to the jamb edge of the doorframe member by tilting the clamp block 9 and the end of the shank portion 8′ of the bolt 8 previously applied to the saddle 6, through the conforming hole in the jamb edge of the doorframe member 70. The saddle section 16 may likewise be secured to the jamb edge of the door body by tilting the clamp block 19 and the end of the shank portion 18′ of the clamp bolt 18 previously applied to the saddle 16, through the conforming hole provided in the jamb edge of the door body 80. The supporting boss 7 extending from the rear face of the saddle 6 is telescoped into the supporting hole presented by the jamb edge of the doorframe member 70, and the head 8″ of the clamp bolt 8 then manipulated to draw the spaced seating legs 9′ of the clamp block 9 into seating engagement with the inner faces of the corner portions 71′—71′ of the doorframe member 70. Likewise, the supporting boss 17 extending from the rear face of the saddle 16 is inserted into the conforming hole provided in the jamb edge of the door body 80, and the clamp bolt 18 externally manipulated to draw the seating legs 19″ of the clamp block 19 into seating engagement with the inner faces of the corner portions 81′—81′ of the door body 80.

Similar hinge assemblies A as above described may be used to provide both the upper and lower hinges for the door body, as illustrated in FIGS. 1 and 2. After application of the upper and lower hinge assemblies to the door body, the stationary cam member 20 is so adjusted as to orient the valley points 23′ of its cam track 23 in conformity with the desired residence position of the door body. This is accomplished by rotating the loosened cam member 20 so that the valley point 23′ of its cam track 23 resides in the plane of the desired residence position of the door body, and then tightening the lower assembly screw 26 to rigidly lock the cam member 20 as well as the hingle pintle 25 to the stationary sleeve 1.

The upper assembly screw 26 may also be adjusted to place its abutment forming head portion 26″ in such position with respect to the upper end of the internal boss 12 of the riding sleeve 11, that the vertical riding movement of the riding sleeve 11 is limited in accordance with the desired angle of swing of the door body to and from the desired residence and maximum open position. As a final assembly operation, the closure caps 27 may be applied to the lowermost pocket 4 or 4′ of the supporting sleeve 1 and the uppermost pocket 14 or 14′ of the riding sleeve 11.

As thus assembled, the component parts of the hinge assembly A will occupy the relative positions shown in FIGS. 22 and 23 when the door body is in closed or residence position; and when the door body is forcibly swung to open position the component parts of the hinge assembly A will occupy the relative positions illustrated in FIGS. 24 and 25. When the door body is released from its open position, the weight of the door will automatically drive the door attached riding hinge part a′ downwardly, until the door body arrives at the adjusted residence position. Thus, the weight of the door body determines the force which operates to automatically swing the door from open position to residence position.

When the door body is relatively light in weight, maximum door closing force may be achieved by concentrating substantially all of the door weight on only one of the hinge assemblies, which may be either the upper or the lower hinge assembly, and which selected gravity operated hinge assembly A incorporates a stationary cam member 20 as a component part thereof. In such case, the other companion hinge assembly may be assembled to operate as a nongravity door aligning hinge assembly A′ by the substitution of a journal forming cylinder 29 as shown in FIGS. 20 and 21 and FIGS. 26–29, for the stationary cam member 20 employed in the gravity operated hinge assembly. In the companion nongravity operated aligning hinge assembly A′ the journal forming cylinder 29 has flat ends and presents a hinge pintle receiving bore 29′ terminating in an internal shoulder defined by an end boss 29′, on which the lower end of the hinge pintle 25 is designed to seat. The internal boss 29″ presents an axially extending reduced diameter bore 29‴, through which the threaded shank portion 26′ of the lower assembly screw 26 is projected for threaded securement to the internally threaded lower end of the hinge pintle 25, as shown in FIGS. 26 and 28.

The lower end portion of the journal forming cylinder 29 is pocketed within one of the complementary cam seating pockets 4 or 4′ of the supporting sleeve 1, and its cylindrical upper portion is pocketed within the adjacent receiving pocket 14 or 14′ of the riding sleeve 11, as shown in FIGS. 26 and 28. The journal forming cylinder 29 is preferably made of a tough and wear resistant plastic compound having a low coefficient of surface friction, and its axial length is somewhat shorter than the axial length of the stationary cam member 20, and so that the flat upper end of the cylinder 29 is spaced from the adjacent riding track 13 of the riding sleeve 11 at all times. All other components of the nongravity aligning hinge assembly, A′ as shown in FIGS. 26–29, are the same as those used in the assembly of the gravity operated hinge assembly A previously described.

The hinge assembly B as illustrated in FIGS. 30–36 comprises a supporting hinge part b designed for attachment to a doorframe, post or pilaster 70; and a swinging hinge part b′ normally positioned above the supporting hingle part b and designed for attachment to a door body 80. The supporting hinge part b generally comprises a supporting sleeve action 1b and an attaching section extending laterally therefrom and designed for attachment to the doorframe member; and the swinging hinge part b′ generally comprises a riding sleeve section 11b positioned above the supporting sleeve section 1b and an attaching section designed for attachment to the door body 80 to be swingably supported.

The saddle sections 6 and 16 of the hinge assembly B are similar in construction to the saddle sections 6 and 16 of the hinge assembly A previously described. However, the supporting sleeve 1b and the riding sleeve 11b, as well as the hinge pintle 25b which operatively connects the riding sleeve 11b to the supporting sleeve 1b of the hinge assembly B, differ in certain structural respects from the corresponding supporting sleeve 1, riding sleeve 11 and hinge pintle 25 of the hinge assembly A previously described. These modifications permit manufacture of the hinge assembly B of fewer parts and somewhat shorter in axial length than the hinge assembly A previously described. However, two of the components of hinge assembly B are not reversible end-for-end, and therefore two sets of these components are required to make the hinge assembly B applicable to both right and left hand swinging door bodies.

The supporting sleeve section 1b of the supporting hinge part b is generally tubular in form and presents an internal supporting boss 2b adjacent the lower end of the sleeve 1b and which has bore 3b extending axially therethrough. The upper face 3b' of the boss 2b is positioned substantially below the upper end of the sleeve 1b to provide a relatively deep upper pocket 14b within which the base portion 21 of the stationary cam member 20 may be rigidly rooted when its serrated end face 21' is seated upon the serrated upper face 3b' of the internal boss 2b of the sleeve 1b. The outer end of the reduced diameter axial bore 3b extending through the supporting boss 2b leads to a screw head receiving pocket 4b' in the underface of the boss 2b as shown in FIGS. 34 and 36.

The stationary cam member 20 which forms a component of the hinge assembly B is preferably molded from a tough and wear-resistant plastic compound having a low coefficient of surface friction, and may be similar in form to the stationary cam member 20 associated with the hinge assembly A previously described. The cam member 20 of hinge assembly B presents a base portion 21 designed to be snugly seated within the cam receiving pocket 4b of supporting sleeve 1b, and the base portion 21 as well as the pocket 4b may be either polygonal or cylindrical in form and sized to snugly interfit. The upper portion 22 of the cam member 20 associated with the hinge assembly B is cylindrical in form and extends a substantially distance above the adjacent end of the supporting sleeve 1b when its base portion 21 is fully and snugly seated within the cam seating pocket 4b. The upper cylindrical portion 22 of the cam member provides journal support for riding sleeve 11b of the swinging hinge part b' as indicated in FIGS. 34 and 36. The upper or outer end of the cylindrical portion 22 presents a pair of complementary semicircular cam tracks 23 each approximately 180 degrees in radial extent, with the adjacent ends of the semicircular cam tracks 23 defining therebetween a valley point 23' and a crown point 23". A hinge pintle receiving bore 24 extends axially into the stationary cam member 20 for the greater part of its length, and terminates in an internal seating shoulder defined by an end boss 24' which has a reduced diameter bore 24" extending therethrough.

The riding sleeve section 11b of the swinging hinge part b' is greater in axial length than the axial length of the supporting sleeve section 1b therebelow, and presents an internal cam forming boss 12b positioned intermediate the ends thereof. The lower face of the boss 12 defines a pair of semicircular riding cam tracks 13b which are complementary to the semicircular cam tracks 23 presented by the stationary cam member 20. The complementary riding cam tracks 13b define the inner end of a cam receiving pocket 14b of cylindrical form which extends to the lower end of the riding sleeve 11b, and provides a pocket of substantial axial length which receives the cylindrical upper portion 22 of the stationary cam member 20, as shown in FIGS. 34 and 36.

The upper end of the riding sleeve 11b also presents an upper pocket 14b' of cylindrical form and whose bottom is defined by the relatively flat upper face of the internal boss 12b, and whose axial length may be substantially less than the axial length of the cam receiving pocket 14b presented by the lower end of the riding sleeve 11b. The upper pocket 14b' is designed to receive and contain the head portion 25b' of a cylindrical hinge pin 25b, whose main shank portion 25b" extends through the axial bore 12b' formed in the internal boss 12b of the riding sleeve 11b. The lower portion of the main shank portion 25b" projects into the hinge pintle receiving bore 24 and its lower end seats upon the internal shoulder presented by the internal end boss 24' at the lower end of the cam member 20. The lower end of the main shank portion 25b" of the hinge pintle 25b also presents a reduced diameter and internally threaded tubular extension 25b'" which is designed to telescope through the reduced diameter bore 24" of the cam member 20 and into the axial bore 3b' of corresponding diameter formed in the internal supporting boss 2b of the supporting sleeve 1b.

The lower end of the hinge pintle 25b is secured to the supporting sleeve 1b by an assembly screw 26b whose threaded shank portion 26b' extends through the axial bore 3b of the end boss 2b of the supporting sleeve 1b, and is threaded into the internally threaded tubular extension 25b'" of the hinge pintle 25b as shown in FIG. 34. The head portion 26b" of the applied assembly screw 26b is pocketed in the lower pocket 4b' of the supporting sleeve 1b, and the head portion 26b" remains exposed for external manipulation. When the assembly screw 26b is tightened, the hinge pintle is rigidly secured in fixed position to the supporting sleeve 1b, and the serrated end 21' of the stationary cam member is drawn into fixed seating abutment against the friction face 3b' presented by the supporting boss 2b of the supporting sleeve 1b.

The upper head portion 25b' of the hinge pintle 25b is pocketed within the upper pocket 14b' of the riding sleeve 11b as shown in FIG. 34, and limits the vertical movement of the riding sleeve 11b as journaled on the main shank portion 25" of the hinge pintle. By loosening the lower assembly screw 26b, the cam member may be rotated to selectively fix the residence position of the swinging door body with respect to the doorframe member on which it is hung. As thus assembled, the riding sleeve 11b is rotatably journaled on the main shank portion 25b" of the hinge pintle 25b extending through the journal forming boss 12b' thereof, and yet permits vertical movement of the riding sleeve with respect to the cylindrical upper portion 22 of the cam member 20 as the internal cam track 13b presented by the riding sleeve 12b rides on the cam track 23 of the cam member 20.

The saddle sections 6 and 16 of the hinge assembly B as illustrated in FIGS. 30–36, may be structurally similar to the saddle sections 6 and 16 of the hinge assembly A as above described. In the hinge assembly B, the saddle 6 extends laterally from the supporting sleeve 1b and is joined thereto by a connecting neck 6' as shown in FIGS. 33, 34, 35 and 36. The saddle 6 presents an inner face conforming to the jamb edge or the doorframe, post or pilaster 70 to which it is to be attached, and presents a pair of spaced seating flanges 6" designed to seat snugly against the outer corner portions 71—71' of the doorframe member 70. The inner face of the saddle 6 also presents a supporting boss 7 preferably circular in form and designed to project into a correspondingly shaped conforming hole formed in the crowned jamb edge portion 72 of the doorframe member 70 to provide hanging support for the supporting hinge part b' as shown in FIGS. 31 and 32. The saddle 6 may be cast, molded or stamped integral with the supporting sleeve 1b, and may be approximately the same in axial length.

A clamp bolt 8 is inserted into and through a countersunk clamp bolt receiving hole 7' extending medially through the saddle 6 and associated supporting boss 7. The clamp bolt 8 has a threaded shank portion 8' of substanial length as shown in FIGS. 32 and 33, designed to be threaded into a threaded bore 9' extending axially through a clamp block 9. The clamp bolt 8 has a tapered head portion 8" designed to seat within the outer countersunk end of the hole 7' so that the outer face of the head portion 8" when fully seated is substantially flush with the outer face of the saddle 6. The clamp block 9 is so shaped and formed as to permit tilted insertion thereof into the supporting hole provided by the jamb face of the doorframe member, when the clamp block 9 has been preapplied to the threaded shank portion 8' of the clamp bolt 8. The clamp block 9 presents a pair of spaced seating legs 9" designed to seat against the inner face of the corner forming portions 71'—71' of the doorframe member 70 as shown in FIG. 31 when the clamp bolt 8 is externally manipulated.

The attaching section of the hinge assembly B may also comprise a saddle 16 extending laterally from the riding sleeve 11B and joined thereto by a connecting neck 16', as shown in FIGS. 33, 34 and 35. The saddle 16 presents an inner face conforming to the jamb edge of the door body to which it is to be attached, and presents a pair of spaced seating flanges 16" designed to seat snugly against the outer corner portions 81'—81' of the door body 80. The inner face of the saddle 16 also presents a supporting boss 17 preferably circular in form, and designed to project into a correspondingly shaped conforming hole formed in the crowned jamb edge portion 82 of the door body 80 to provide hanging support for the riding hinge part b'. The saddle 16 may be cast, molded or otherwise formed as an integral part of the supporting sleeve 1.

The saddle 16 extending laterally from the riding sleeve 11b, may have substantially the same axial length as the saddle 6 extending laterally from the lower supporting sleeve 1b, and as shown in FIGS. 33 and 34, the upper end of the saddle 16 may extend substantially flush with the upper end of its riding sleeve 11b but short of the lower end thereof. To provide an attractive hinge assembly, the lower portion of the riding sleeve 11b extending below the lower end of its associated saddle 16, may be defined by a circumferentially extending joint-simulating groove 11b' as shown in FIGS. 30, 33 and 34, so that the upper portion of the riding sleeve 11b extending above the circumferential groove 11b' is substantially similar in axial length to the axial length of the riding sleeve 1b therebelow.

The attaching section of the hinge assembly B also includes a clamp bolt 18, designed for insertion into and through a countersunk bolt receiving hole 17' extending medially through the saddle 16 and its associated supporting boss 17. The clamp bolt 18 has a threaded shank portion 18' of substantial length as shown in FIGS. 31 and 33, designed to be threaded into a threaded bore extending axially through a clamp block 19. The clamp bolt 18 has a tapered head portion 18" designed to seat within the outer countersunk end of the bolt hole 17' so that the outer face of its head portion 18" when fully seated, is substantially flush with the outer face of the saddle 16. The clamp block 19 is so shaped and formed as to permit tilted insertion thereof into the supporting hole provided in the jamb face of the door body 80, after the clamp block 19 has been preapplied to the threaded shank portion 18' of the clamp bolt 18. The clamp block 19 presents a pair of spaced seating legs 19" designed to be drawn into seating abutment against the inner faces of the corner forming portions 81'—81' of the door body 80 as shown in FIG. 31 when the clamp bolt 18 is externally manipulated.

Since neither the supporting sleeve 1b nor the riding sleeve 11b of the hinge assembly B are symmetrical in form, and since the sleeves 1b and 11b respectively present only one cam receiving pocket 4b and 14b which must be positioned in adjacent relation to receive and contain the stationary cam member 20 as shown in FIG. 34, a right hand and a left hand supporting sleeve 1b, and a left hand and a right hand riding sleeve 11b are required to accommodate the hinge assembly B for application to both right and left hand swinging door and adjacent door supporting frame members. Thus, one supporting sleeve 1b requires an attaching saddle 6 projecting from the right hand side thereof and the other supporting sleeve 1b requires an attaching saddle 6 projecting from the left hand side thereof. Similarly, one riding sleeve 11b requires an attaching saddle 16 projecting from the left hand side thereof and the other riding sleeve 11b requires an attaching saddle 16 projecting from the right hand side thereof.

However, the same stationary cam member 20, the same hinge pintle 25b and the same assembly screw 26b are incorporated into all hinge assemblies of type B, adapted for application to either right or left hand swinging doors and adjacent pilasters. By selecting the appropriate stationary sleeve 1b having its attaching saddle 6 extending from the right hand or left hand side thereof, and by selecting the appropriate riding sleeve 11b having its saddle 16 extending from the left or right hand side thereof, hinge assemblies for either right or left hand swinging doors can be assembled with remaining standard components.

The hinge assembly B may be conveniently attached to the door body 80 and supporting pilaster 70 by applying the saddle 6 extending from the supporting sleeve 1b to the supporting frame member 70 and securing the saddle thereto by manipulation of the clamping bolt 8 and clamping block 9 in the manner heretofore described. Similarly, the riding sleeve 11b may be attached to the door body by applying its saddle 16 to the jamb edge of the door body 80 and securing the same in position by the clamp bolt 18 and clamp block 19 in the manner heretofore described. The base portion 21 of the cam member 20 may be telescoped into the receiving pocket 4b of the supporting sleeve 1b either before or after the sleeve 1b is secured ot the doorframe member. The riding sleeve 11b with door attached may then be telescoped over the upper cylindrical portion 22 of the cam member 20, and when the door body is swung to residence position, the cylindrical portion 22 will be fully contained within the cam receiving pocket 14b of the riding sleeve 11b. The main cylindrical shank portion 25b" of the hinge pintle 25b may then be telescoped through the axial bore 12b' of the riding sleeve 11b, and into the bore 24 of the cam member 20, and with its internally threaded reduced diameter extension 25b'" telescoped through the reduced diameter bore 24" of the cam member 20 and into the aligned reduced diameter bore 3b of the supporting sleeve 1b. The assembly screw 26b is then applied, the cam member 20 rotated to place the valley point 23' of its cam tracks 23 in a position to maintain the door in the desired residence position. The assembly screw 26b is then tightened to clamp the cam member 20 in its selectively adjusted position and to rigidly secure the hinge pintle 25b to the supporting sleeve 1b.

The cam operated hinge assembly C is illustrated in FIGS. 40–46, includes a supporting hinge part c and a swinging hinge part c' which respectively presents a supporting sleeve 1b and a riding sleeve 11b which are similar in construction to the supporting sleeve 1b and riding sleeve 11b of the hinge assembly B illustrated in FIGS. 30–36 and above described. In addition to the supporting sleeve 1b and riding sleeve 11b, the complete hinge assembly C also incorporates a stationary cam member 20, a hinge pintle 25b and an assembly screw 26b which are in all respects similar to the corresponding parts associated with hinge assembly B previously described, and the description of these components will not be repeated. However, the supporting hinge part c incorporates a wing leaf 30 integral with and extending laterally from its supporting sleeve 1b for securing the same to a side face of the doorframe member, post or pilaster 70, and the swinging hinge part c' incorporates a wing leaf 40 integral with and extending laterally from its riding sleeve 11b for securing the same to the door body 80, and which differ from the pilaster and door body attaching means associated with hinge assembly B.

The wing leaf 30 of the supporting hinge part c is joined to the supporting sleeve 1b by a sturdy connecting neck 31 which extends substantially the full axial length of the sleeve, and additionally presents an upper extension 30' which projects above the upper end of the supporting sleeve 1b for a distance approximately corresponding to the axial length of the riding sleeve 11b. The wing leaf 30 and its upper extension 30' together present a rear seating shoulder 32 designed to snugly abut the adjacent corner portion 71' of the doorframe member 70, a rear seating face 32' designed to snugly seat against the adjacent side face of the doorframe member 70, and a tapered front face 33 of attractive contour as shown in FIGS. 37, 38 and 40. A pair of spaced studs 34 formed integral with and projecting at right angles from the rear seating face 32′ of the wing leaf 30 and its upper extension 30′, are designed for insertion into corresponding spaced holes drilled into the doorframe member 70.

A backing plate 35, corresponding in width and length to the wing leaf 30 and its upper extension 30′, is preferably applied to the opposite side face of the doorframe member 70, as shown in FIGS. 38, 39 and 40. The backing plate 35 presents a seating lip 36 designed to abut the adjacent corner portion 71′ of the doorframe member, and a rear seating face 36′ designed to snugly seat against the adjacent side face portion of the doorframe member 70. The backing plate 35 also presents a pair of spaced countersunk holes 35′ which align with the spaced studs 34 extending from the wing leaf 30 and its upper extension 30′ as applied to the doorframe member 70. A pair of clamping screws 37 are inserted into the holes 35′ in the backing plate. Each clamping screw 37 presents a threaded shank portion 37′ which is inserted into a threaded bore formed in the spaced stud 34 aligned therewith, and the screws are tightened until their head portions 37″ are fully pocketed in the countersunk holes 35′ in the backing plate 35.

The wing leaf 40 of the swinging hinge part c′ is joined to its riding sleeve 11b by a sturdy connecting neck 41 which extends from the upper end of the sleeve 11b to the circumferential joint-simulating groove 11b′ thereof. The groove 11b′ is so positioned that the upper portion of the sleeve 11b above the groove has an axial length susbtantially corresponding to the axial length of the supporting sleeve 1b therebelow. The wing leaf 40 presents a lower extension 40′ which projects below the circumferential groove 11b′ and whose lower end extends substantially to the lower end of the supporting sleeve 1b when the adjacent ends of the supporting sleeve 1b and riding sleeve 11b are substantially in abutment as shown in FIG. 37.

The wing leaf 40 and its lower extension 40′ together present a rear seating shoulder 42 designed to snugly abut the adjacent corner portion 81′ of the door body 80, a rear seating face 42′ designed to snugly seat against the adjacent side face of the door body 80, and a tapered front face 43 of attractive contour, as shown in FIGS. 37, 38, 40 and 42. A pair of spaced studs 44, formed integral with and projecting at right angles from the rear seating face 42′ of the wing leaf 40 and its upper extension 40′, are designed for insertion into corresponding spaced holes drilled in the door body 80.

A backing plate 45, corresponding in width and length to the wing leaf 40 and its lower extension 40′, is preferably applied to the opposite side face of the door body 80, as shown in FIGS. 38, 39 and 40. The backing plate 45 presents a seating lip 46 designed to abut the adjacent corner portion 81′ of the door body 80, and a rear seating face 46′ designed to snugly seat against the adjacent side face portion of the door body 80. The backing plate 45 also presents a pair of spaced countersunk holes 45′ which align with the spaced studs 44 extending from the wing leaf 40 and its lower extension 40′ as applied to the door body 80. A pair of clamping screws 47 are inserted into the holes 45′ in the backing plate, and each clamping screw 47 presents a shank portion 47′ which is threaded into the bore formed in the stud 44 aligned therewith, and the screws are then tightened until their head portions 47″ are fully pocketed in the countersunk holes 45′ of the backing plate 45.

The wing leaf 30 and upper extension 30′ of the supporting hinge part c may be secured to the pilaster body 70 at the factory or in the field, and the wing leaf 40 and lower extension 40′ of the riding hinge part c′ may also be attached to the door body at the factory or in the field. The stationary cam member 20 is applied to the supporting sleeve 1b, the riding sleeve 11b of the swinging hinge part c′ then telescoped over the upper cylindrical portion 22 of the stationary cam, the hinge pintle 25b then inserted into the axial bore 12b′ of the riding sleeve 11b and into the hinge pintle receiving bore 24 of the cam member 20; and the assembly screw 26b then applied. Resdience adjustment of the mounted door can then be made by proper orientation of the stationary cam member 20 as heretofore described.

To satisfy both right and left hand swinging door conditions, the same stationary cam member 20, hinge pintle 25b, assembly screw 26b, pilaster backing plate 35, and door backing plate 45 may be used. Only the supporting sleeve 1b and its wing leaf 30, together with the riding sleeve 11b and its wing leaf 40, need be duplicated as right and left hand components.

The cam operated hinge assembly D as illustrated in FIGS. 44–50, includes a supporting hinge part d and a swinging hinge part d′ which respectively present a supporting sleeve 1b and a riding sleeve 11b of the hinge assembly B illustrated in FIGS. 30–36 and hinge assembly C illustrated in FIGS. 37–43 and above described. In addition to the supporting sleeve 1b and riding sleeve 11b, the complete hinge assembly D also incorporates a stationary cam member 20, a hinge pintle 25b and an assembly screw 26b which are in all respects similar to the corresponding parts associated with hinge assemblies B and C previously described, and the description of these components will not be repeated.

The supporting hinge part d of hinge assembly D has a pilaster attaching wing leaf 30d which is integrally joined to its supporting sleeve 1b by a sturdy connecting neck 31d which extends substantially the full length of the sleeve. The wing leaf 30d additionally presents an upper extension 30d′ which projects above the upper end of the supporting sleeve 1b for a distance approximately corresponding to the axial length of the riding sleeve 11b. The wing leaf 30d and its upper extension 30d′ together present a rear seating shoulder 32d designed to snugly abut the adjacent corner portion 71′ of the doorframe member 70, a rear seating face 32d′ designed to snugly seat against the adjacent side face of the doorframe member 70, and a front face 33d which is substantially parallel to the rear face 37d′, as shown in FIGS. 45, 47 and 49. The wing leaf 30d and its upper extension 30d′ present a pair of spaced countersunk holes 34d which receive the countersunk head portion of a pair of clamping screws 37d.

A backing plate 35d, corresponding in width and length to the wing leaf 30d and its upper extension 30d′, is preferably applied to the opposite side face of the doorframe member 70, as shown in FIGS. 45, 46 and 47. The backing plate 35d presents a seating lip 36d designed to abut the adjacent corner portion 71′ of the doorframe member, and a rear seating rim 36d′ designed to snugly seat against the adjacent side face portion of the doorframe member 70. The backing plate 35d also presents a pair of spaced studs 38 formed integral with and projecting at right angles from its rear face, and are designed for insertion into corresponding spaced holes drilled into the doorframe member 70. The clamping screws 37d, inserted into the holes 34d in the wing leaf 30d and its upper extension 30d′, each presents a threaded shank portion 37d′ which is inserted into the threaded bore formed in the studs 38 aligned therewith, and the screws are tightened until the head portions thereof are fully pocketed in the countersunk holes 34d in the wing leaf 30d and its extension 30d′.

The swinging hinge part d′ also presents a wing leaf 40d integrally joined to its riding sleeve 11b by a sturdy connecting neck 41d which extends from the upper end of the sleeve 11b to the circumferential joint-simulating groove 11b′ thereof. The groove 11b′ is so positioned that the upper portion of the sleeve 11b above the groove has an axial length substantially corresponding to the axial length of the supporting sleeve 1b therebelow. The wing leaf 40d presents a lower extension 40d′ which projects below the circumferential groove 11b′ whose lower end extends substantially to the lower end of the supporting sleeve 1b when the adjacent ends of the supporting sleeve 1b and riding sleeve 11b are substantially in abutment as shown in FIG. 44.

The wing leaf 40d and its lower extension 40d' together present a rear seating shoulder 42d designed to snugly abut the adjacent corner portion 81' of the door body 80, a rear seating face 42d' designed to snugly seat against the adjacent side face of the door body 80, and a flat front face 43d which is substantially parallel to the rear face 42d', as shown in FIGS. 44, 45, 47 and 49. A pair of spaced countersunk holes 44d extend through the wing leaf 40d and its lower extension 40d' which receive the countersunk head portions of a pair of clamping screws 47d.

A backing plate 45d, corresponding in width and length to the wing leaf 40d and its lower extension 40d', is preferably applied to the opposite side face of the door body 80, as shown in FIGS. 45, 46 and 47. The backing plate 45d presents a seating lip 46d designed to abut the adjacent corner portion 81' of the door body 80, and a rear seating rim 46d' designed to snugly seat against the adjacent side face portion of the door body 80. The backing plate 45d also presents a pair of spaced studs 48 integral with and projecting at right angles from its rear face, and are designed for insertion into corresponding spaced holes drilled in the door body 80. The clamping screws 47d, inserted into the holes 44d in the leaf wing 40d and its lower extension 40d', present a shank portion 47d' which is threaded into the bore formed in the studs 48 aligned therewith, and the screws 47d are then tightened until their head portions are fully pocketed in the countersunk holes 44d of the wing leaf 40d and its extensoin.

The wing leaf 30d and its upper extension 30d' of the supporting hinge part d may be secured to a pilaster body 70 at the factory or in the field, and the wing leaf 40d and its lower extension 40d' of the riding hinge part d' may also be attached to the door body at the factory or in the field. The stationary cam member 20 is applied to the supporting sleeve 1b, the riding sleeve 11b of the swinging hinge part d' then telescoped over the upper cylindrical portion 22 of the stationary cam member 20, the hinge pintle 25b then inserted into the axial bore 12b' of the riding sleeve 11b and into the hinge pintle receiving bore 24 of the cam member 20, and the assembly screw 26b then applied. Residence adjustment of the mounted door can then be made by proper orientation of the stationary cam member 20 as heretofore described.

To satisfy both right and left hand swinging door conditions, the same stationary cam member 20, hinge pintle 25b, assembly screw 26b, pilaster backing plate 35d, and door backing plate 45d may be used. Only the supporting sleeve 1b and its wing leaf 30d, together with the riding sleeve 11b and its wing leaf 40d, need be duplicated as right and left hand components.

The cam operated hinge assembly E as illustrated in FIGS. 51–57, includes a supporting hinge part e and a swinging hinge part e' which respectively present a supporting sleeve 1b and a riding sleeve 11b which are similar in construction to the supporting sleeve 1b and riding sleeve 11b of the hinge assembly B illustrated in FIGS. 30–36, the hinge assembly C illustrated in FIGS. 37–43, and the hinge assembly D illustrated in FIGS. 44–50 and above described. In addition to the supporting sleeve 1b and riding sleeve 11b, the complete hinge assembly E also incorporates a stationary cam member 20, a hinge pintle 25b and an assembly screw 26b which are in all respects similar to the corresponding parts associated with hinge assemblies B, C and D previously described, and the description of these components will not be repeated.

The cam operated hinge assembly E is particularly designed for application to square cornered doors and pilasters of substantially different thickness, and where it is desired to swingably mount the door body so that its hinged jamb edge is positioned as close as possible to the adjacent jamb edge of the pilaster or doorframe member. As shown for purposes of illustration in FIG. 52, this objective can best be achieved by providing a pilaster or doorframe member 70e having a flat jamb face 72e and square corners 71e—71e, and a door body 80e having a flat jamb face 82e and square corners 81e—81e. Such pilasters and door bodies can be made of solid wood, or other materials built up from laminated layers, or made of hollow metal or other sheet material.

For such pilaster and door bodies, the supporting hinge part e has a supporting wing leaf 30e designed to seat on an adapter plate 39 which presents a shouldered front face 39', a rear seating lip 39" designed to overlap the adjacent corner 71e of the pilaster, and a rear seating face 39''' which seats flatly against the adjacent side face portion of the pilaster 70e as shown in FIG. 52. The riding hinge part e' has a swinging wing leaf 40e which also seats on an adapter plate 49 which presents a shouldered front face 49', a rear seating lip 49" designed to overlap the adjacent corner 81e of the door body 80e, and a rear seating face 49''' which seats flatly against the side face portion of the door body 80e. The shouldered front face 49' joins the seating lip 49" of the adapter plate 49 by a chamferred vertical edge 49e and the shouldered front face 39' joins the seating lip 39" of the adapter plate 39 by an inclined vertical edge 39e which overhangs the chamferred vertical edge 49e of the door body-supported adapter plate 49 as shown in FIG. 52 when the door is closed.

The supporting hinge part e' of the hinge assembly E has an attaching wing leaf 30e which is integrally joined to its supporting sleeve 1b by a sturdy connecting neck 31e which extends substantially the full axial length of the sleeve. The wing leaf 30e additionally presents an upper extension 30e' which projects above the upper end of the supporting sleeve 1b for a distance approximately corresponding to the axial length of the riding sleeve 11b. The wing leaf 30e and its upper extension 30e' together present a rear seating shoulder 32e and a rear seating face 32e' designed to snugly seat against the shouldered front face 39' of the adapter plate 39 as shown in FIG. 52. The adapter plate 39 has substantially the same length as the wing leaf 30e and its upper extension 30e'. The front face 33e of the wing leaf 30e and its upper extension 30e' is substantially parallel to the rear face 32e', as shown in FIGS. 52, 53 and 56. The wing leaf 30e and its upper extension 30e' present a pair of spaced countersunk holes 34e which align with corresponding holes extending through the adapter plate 39.

A backing plate 35e, corresponding in width and length to the adapter plate 39, is preferably applied to the opposite side face of the doorframe member 70e, as shown in FIGS. 52, 53 and 54. The backing plate 35e presents a seating lip 36e designed to abut the adjacent corner portion 71e of the doorframe member 70e, and a rear seating face 36e' designed to snugly seat against the adjacent side face portion of the doorframe member 70e. The backing plate 35e also presents a pair of spaced countersunk holes 35e' into which screw receiving studs 38e are inserted. The studs 38e present internally threaded tubular shanks 38e' designed for insertion into corresponding spaced holes drilled into the doorframe member 70e. Clamping screws 37e, inserted into the holes 34e in the wing leaf 30e and its upper extension 30e', each presents a threaded shank portion 37e' which is inserted into the threaded bore of the screw receiving studs 38e aligned therewith, and the screws 37e are then tightened until the head portions thereof are fully pocketed in the countersunk holes 34e in the wing leaf 30e and its extension 30e'.

The swinging hinge part e' also presents a wing leaf 40e integrally joined to its riding sleeve 11b by a sturdy connecting neck 41e which extends from the upper end of the sleeve 11b to the circumferential joint-simulating groove 11b' thereof. The groove 11b' is so positioned that the upper portion of the sleeve 11b above the groove has an axial length substantially corresponding to the axial length of the supporting sleeve 1b therebelow. The wing leaf 40e presents a lower extension 40e' which projects below the circumferential groove 11b' and whose lower end extends substantially to the lower end of the supporting sleeve 1b when the adjacent ends of the supporting sleeve 1b and riding sleeve 11b are substantially in abutment as shown in FIG. 51.

The wing leaf 40e and its lower extension 40e' together present a rear seating shoulder 42e and a rear seating face 42e' designed to snugly seat against the shouldered front face 49' of the adapter plate 49 as shown in FIG. 52. The adapter plate 49 has substantially the same length as the wing leaf 40e and its lower extension 40e'. The front face 43e of the wing leaf 40e and its lower extension 40e' is substantially parallel to its rear face 42e', as shown in FIGS. 51, 52, 54 and 55. A pair of spaced countersunk holes 44e extend through the wing leaf 40e and its lower extension 40e', which align with corresponding holes extending through the adapter plate 49, and which holes receive the countersunk head portions of a pair of clamping screws 47e.

A backing plate 45e, corresponding in width and length to the adapter plate 49, is preferably applied to the opposite side face of the door body 80e, as shown in FIGS. 52, 53 and 54. The backing plate 45e presents a seating lip 46e designed to abut the adjacent corner portion 81e of the door body 80e, and a rear seating face 46e' designed to snugly seat against the adjacent side face portion of the door body 80e. The backing plate 45e also presents a pair of spaced countersunk holes 45e' into which screw receiving studs 48e are inserted. The studs 48e present internally threaded tubular shanks 48e' designed for insertion into corresponding spaced holes drilled in the door body 80e. Clamping screws 47e, inserted into the holes 44e in the leaf wing 40e and its lower extension 40e' present a shank portion 47e' which is threaded into the bore of the screw receiving studs 48e aligned therewith, and the screws 47e are then tightened until their head portions are fully pocketed in the countersunk holes 44e of the wing leaf 40e and its extension.

The wing leaf 30e and its upper extension 30e' of the supporting hinge part e may be secured to a pilaster body 70e at the factory or in the field, and the wing leaf 40e and its lower extension 40e' of the riding hinge part e' may also be attached to the door body at the factory or in the field. The stationary cam member 20 is applied to the supporting sleeve 1b, the riding sleeve 11b of the swinging hinge part e' then telescoped over the upper cylindrical portion 22 of the stationary cam member 20, the hinge pintle 25b then inserted into the axial bore 12b' of the riding sleeve 11b and into the hinge pintle receiving bore 24 of the cam member 20, and the assembly screw 26b then applied. Residence adjustment of the mounted door then can be made by proper orientation of the stationary cam member 20 all as heretofore described.

It will be noted that the adapter plates 39 and 49 as well as the backing plates 35e and 45e are symmetrical in form and can be reversed end-for-end to satisfy both right and left hand door conditions. Also, both right and left hand swinging door conditions are satisfied by the stationary cam member 20, hinge pintle 25b, and assembly screw 26b. Only the supporting sleeve 1b and its wing leaf 30e, together with the riding sleeve 11b and its wing leaf 40e, need to be duplicated as right and left hand components.

The cam operated hinge assembly F as illustrated in FIGS. 58–64, includes a supporting hinge part f and a swinging hinge part f' which respectively present a supporting sleeve 1b and a riding sleeve 11b which are similar in construction to the supporting sleeve 1b and riding sleeve 11b of the hinge assembly B illustrated in FIGS. 30–36, the hinge assembly C illustrated in FIGS. 37–43, the hinge assembly D illustrated in FIGS. 44–50, the hinge assembly E illustrated in FIGS. 51–57, and above described. In addition to the supporting sleeve 1b and riding sleeve 11b, the complete hinge assembly F also incorporates a stationary cam member 20, a hinge pintle 25b and an assembly screw 26b which are in all respects similar to the corresponding parts associated with hinge assemblies B, C and D and E previously described, and the description of these components will not be repeated.

The hinge assembly F provides a hinge construction of great strength. Its supporting hinge part f includes a pilaster-attaching saddle bracket 50 whose web section 51 is integrally joined to the supporting sleeve 1b. The web section 51 is approximately the same axial length as the supporting sleeve 1b, and presents a flat outer face and a contoured inner face 51' which is shaped to snugly interfit with the exterior contour of the corner portions 71'—71' and the crowned intermediate portion 72 of the doorframe member of pilaster 70. A pair of spaced side flanges 52—52, integral with the web section 51, present a pair of upper side flange extensions 52'—52' whose inner faces snugly overlap the opposite side faces of the pilaster 70. The upper side flange extensions 52'—52' have an axial length substantially equal to the axial length of the riding sleeve 11b, and present seating lip extensions 53—53 designed to seat against the outer surfaces of the corner portions 71'—71' of the pilaster 70. The spaced side flanges 52 and their flange extensions 52' present flat outer faces and a pair of countersunk holes 54 extend through each of the side flanges 52 and their flange extensions 52'.

A pair of screw receiving studs 38f having tubular shanks 38f' are inserted through one pair of countersunk holes 54 presented by one of the side flanges 52 and its flange extension 52', and the shanks 38f' extend into bored holes in the pilaster 70 as shown in FIG. 59. A pair of companion clamping screws 37f are inserted into the countersunk holes 54 presented by the other side flange 52 and its flange extension 52'. The clamping screws 37f present threaded shanks 37f' designed to be threaded into the tubular shanks 38f' of the screw receiving studs 38f aligned therewith, to thereby rigidly secure the stationary saddle bracket 50 to the doorframe member or pilaster 70.

The swinging hinge part f' includes a door body attaching saddle bracket 60 whose web section 61 is integrally joined to the riding sleeve 11b. The web section 61 is approximately the same axial length as the riding sleeve 11b and presents a flat outer face and a contoured inner face 61' which is shaped to snugly interfit with the exterior faces of the corner portions 81'—81' and the crowned intermediate portion 82 of the door body 80. A pair of spaced side flanges 62—62 integral with the web section 61 present a pair of downwardly extending side flange extensions 62'—62' whose inner faces snugly overlap the opposite side faces of the door body 80. The side flange extensions 62'—62' present seating lip extensions 63—63 designed to seat against the outer surfaces of the corner portions 81'—81' of the door body 80. The flange extensions 62' project below the riding sleeve 11b and their lower ends extend substantially to the lower end of the supporting sleeve 1b when the adjacent ends of the supporting sleeve 1b and riding sleeve 11b are substantially in abutment as shown in FIG. 58. The spaced side flanges 62 and their flange extensions 62' present flat outer faces, and a pair of countersunk holes 64 extend through each of the side flanges 62 and their flange extensions 62'.

A pair of screw receiving studs 48f having tubular shanks 48f' are inserted through one pair of countersunk holes 64 presented by one of the side flanges 62 and its flange extension 62', and the shanks 48f' extend into bored holes in the door body 70, as shown in FIG. 59. A pair of companion clamping screws 47f are inserted into the countersunk holes 64 presented by the other side flange 62 and its flange extension 62'. The clamping screws 47f present threaded shank portions 47f' designed to be threaded into the tubular shanks 48f' of the screw receiving studs 48f and thereby rigidly secure the swinging saddle bracket 60 to the door body 80.

The saddle bracket 50 of the supporting hinge part f may be secured to a pilaster body 70 at the factory or in the field, and the saddle bracket 60 of the swinging hinge part f' may also be attached to the door body 80 at the factory or in the field. The stationary cam member 20 is applied to the supporting sleeve 1b, the riding sleeve 11b of the swinging hinge part f' then telescoped over the upper cylindrical portion 22 of the stationary cam member 20, the hinge pintle 25b then inserted into the axial bore 12b' of the riding sleeve 11b and into the hinge pintle receiving bore 24 of the cam member 20, and the assembly screw 26b then applied. Residence adjustment of the mounted door can then be made by proper orientation of the stationary cam member 20 as heretofore described.

To satisfy both right and left hand swinging door conditions, the same stationary cam member 20, hinge pintle 25b and assembly screw 26b may be used. Only the supporting sleeve 1b and its saddle bracket 50, together with the riding sleeve 11b and its saddle bracket 60, need be duplicated as right and left hand components.

The cam members 20 used in all the hinge assemblies of this invention, when molded of "Zytel" plastic or the like, are extremely strong, tough and wear-resistant. The journal forming cylindrical body portion 22 and cam tracks 23 of the cam member 20 have a low coefficient of surface friction, thereby providing a smooth and substantially frictionless journal for the rotative and tracking movement of the riding sleeve 11 or 11b as thereon telescoped, with minimal internal wear of the riding sleeve 11 or 11b.

The sturdy hinge pintle 25 and associated assembly screws 26 of the hinge assembly A, and the hinge pintle 25b and associated assembly screw 26b of the hinge assemblies B, C, D, E and F, may be machined from non-corroding steel, bronze aluminum alloy, Zytel plastic or the like, with minimum friction and wear of the journaling bore 12' or 12b' of the riding sleeve 11 or 11b through which the hinge pintle 25 or 25b extends.

The supporting sleeve 1 or 1b and its associated pilaster attaching section 6, 30, 30d, 30e or 50 may be integrally cast as a unit from a suitable die-casting metal, or may be integrally molded from a strong and tough plastic molding compound, or may be inexpensively made as a metal stamping. In the same manner, the riding sleeve 11 or 11b, and its associated door-attaching section 16, 40, 40d, 40e or 60, may be integrally cast as a unit from a suitable die-casting metal, or unitarily molded from a strong and tough plastic compound, or may be unitarily and inexpensively formed as a metal stamping.

The supporting hinge part a of the hinge assembly A, composed of the unitary supporting sleeve 1 and attaching section 6, and its companion swinging hinge part a', composed of the riding sleeve 11 and its associated attaching section 16, are both symmetrical in form and may both be reversed end-for-end for attachment to either right or left hand swinging doors and associated pilasters, thereby reducing the number of different components to be carried in stock.

In the interest of maintaining attractive contours and high strength, the unitary supporting hinge part b and swinging hinge part b' of hinge assembly B, the unitary supporting hinge part c and swinging hinge part c' of hinge assembly C, the unitary supporting hinge part d and unitary swinging hinge part d' of hinge assembly D, the unitary supporting hinge part e and unitary swinging hinge part e' of hinge assembly E, and the unitary supporting hinge part f and unitary swinging hinge part f' of hinge assembly F, are not truly symmetrical and reversible end-for-end to satisfy both right and left hand door conditions, but must be formed as right and left hand components. However, the cam member 20, hinge pintle 25b, and assembly screw 26b associated with these hinge components, are standard for all hinge assemblies and swinging doors and pilaster conditions.

Hinge assemblies constructed in accordance with this invention are highly stable and sturdy in operation, because the riding sleeve 11 or 11b is smoothly journaled on both the upper cylindrical portion 22 of the cam member 20, as well as on the sturdy shank section of the hinge pintle 25 or 25b, and because the lower ends of the cam member 20 and hinge pintle 25 or 25b are both rigidly secured to the supporting sleeve 1 or 1b by the assembly screw 26 or 26b.

The head portion 26" of the adjustable upper assembly screw 26 used in the hinge assembly A, and the head portion 25b' of the hinge pintle 25b used in the hinge assemblies B, C, D, E and F, operate to maintain the riding sleeve 11 or 11b in assembled association with the supporting sleeve 1 or 1b and prevents undesired dislocation of the door body from its intended mounted position, additionally excludes the entry of dirt and foreign matter into the journal forming bore 12' or 12b' of the riding sleeve 11 or 11b, or into the lower cam receiving pocket 14 or 14' or 14b and riding cam track of the riding sleeve 11 or 11b, and further limits the predetermined maximum opened position of the door body. It will be appreciated that the head portion 25b' of the hinge pintle 25b may be replaced by the head portion 26" of an upper assembly screw 26 threadably secured to the upper end of its pintle shank 25b" so that the vertical riding movement of the riding sleeve 11b and the corresponding maximum open position of the door body, may be externally adjusted as desired after the door is hung.

Additionally, by a slight loosening of the lower assembly screw 26 or 26b, the supporting cam member 20 may be manually rotated to orient its valley point 23' and crown point 23" in accordance with the desired residence position of the hung door body, and the cam member 20 then fixed in its adjusted position by tightening the assembly screw 26 or 26b, either during installation or at any time after installation.

Hinge assemblies constructed in accordance with this invention may be quickly assembled and installed, either partly at the factory or completely in the field, with the assurance that the upper and lower hinge assemblies are in accurate hinging alignment for smooth and substantially frictionless swinging movement of the door body. These hinge assemblies are made from a relatively limited number of components which can be manufactured and formed at relatively low cost, and when installed in accordance with this invention are attractive in appearance and attractively harmonious with the door bodies and supporting frame members with which they are associated.

While certain novel features of this invention have been disclosed herein and are pointed out in the claims, it will be understood that various omissions, substitutions, and changes may be made by those skilled in the art without departing from the spirit of this invention.

Having thus described my invention, I claim:

1. A hinge member including an elongated body portion having a longitudinal axis and first and second opposite end portions, a substantially cylindrical bore formed in each of said first and second end portions substantially axially of said longitudinal axis, each of said bores having a bottom surface defining an inclined cam track sloping circumferentially of said bores.

2. The device of claim 1 wherein each of said cam tracks includes a high point and a low point, said high points and low points being in axial alignment parallel to said longitudinal axis.

3. The device of claim 1 and further including a substantially cylindrical hole in said body portion of smaller diameter than said bores, said hole interconnecting said bores.

4. The device of claim 1 and further including a cooperating hinge part having a boss portion, said boss portion having a pocket therein, a cam member having first and second cam end portions, said first cam end portion being nonrotatably received in said pocket, said second cam end portion being received in one of said bores, said second cam end portion having an inclined cam track formed thereon and cooperating with said cam track in said one bore to shift said hinge member and said hinge part away from one another along said longitudinal axis when said hinge member and said hinge part are rotated relative to one another about said longitudinal axis.

5. The device of claim 4 wherein said boss portion of said hinge part has a pair of oppositely facing pockets therein and said first end of said cam member is nonrotatably received in one of said pockets.

6. The device of claim 4 wherein said body portion has a substantially cylindrical hole therein of smaller diameter than said bores and said cam member has an axial cam bore formed therein of substantially the same diameter as said hole and extending from said second end portion of said cam member toward said first end portion of said cam member, and a hinge pintle extending through said hole and said cam bore.

7. The device of claim 1 wherein said bottom surfaces of said bores defining said inclined cam tracks are formed integrally with said body portion.

8. A hinge assembly comprising; a first hinge part including a lug having a longitudinal axis and first and second opposite end portions, a substantially cylindrical bore formed in each of said first and second end portions in alignment with said longitudinal axis, circumferentially inclined cam track means in each of said bores, a second hinge part including a substantially cylindrical cam member having a cam end portion terminating in a circumferentially inclined cam surface, said cam member being rotatably received in one of said first and second bores with said cam surface cooperatively engaging one of said cam track means, said cam member being nonrotatable relative to said second hinge part, whereby rotation of said first and second hinge parts relative to one another shifts said first and second hinge parts away from one another through cooperation of said cam surface and said one cam track means.

9. The hinge of claim 8 wherein said second hinge part includes a pair of oppositely facing pockets and said cam member has a mounting end portion releasably and nonrotatably positioned in one of said pockets.

10. The hinge of claim 8 wherein said inclined cam track means are formed integrally with said lug.

11. The hinge of claim 8 wherein said lug has a hole therethrough interconnecting said cam track means and said bores, said cam member having a cam bore therein, and a hinge pintle received in said hole and said cam bore.

12. The hinge of claim 11 and further including securing means securing said pintle to said second hinge part.

13. A hinge assembly comprising; a first hinge part including a sleeve having a pair of cylindrical bores extending in opposite directions from internal boss means positioned in said sleeve, said boss means having a journal forming hole therethrough in alignment with said bores, said boss having inclined cam track means formed thereon, a second hinge part including a pocket, a cylindrical cam member having a cam end portion terminating in an inclined cam surface, said cam member having a mounting end portion removably received in said pocket, said cam member being received in one of said bores with said cam surface cooperatively positioned adjacent said cam track means, said cam member having an axial cam bore therein extending from said cam end portion toward said mounting end portion, said cam bore having substantially the same diameter as said hole in said boss, and a pintle received in said hole and said cam bore.

14. The hinge of claim 13 and including securing means securing said pintle to said second hinge part.

15. The hinge of claim 14 wherein said cam bore terminates short of said mounting end portion and said mounting end portion has a cam hole therein of substantially smaller diameter than said cam bore, said cam hole intersecting the bottom of said cam bore, the bottom of said cam bore around said cam hole defining a clamping shoulder, said pintle and securing means cooperating with said shoulder to nonrotatably clamp said mounting end portion of said cam member in said pocket.

16. A hinge part including a pocket, a cylindrical journal member having a mounting end received in said pocket, said journal member having a free end portion, there being a bore in said journal member extending from said free end toward said mounting end, said bore having a bottom, there being a hole in said mounting end of substantially smaller diameter than said bore, said hole intersecting said bottom of said bore, said bottom of said bore around said hole defining a clamping shoulder, a pintle received in said bore, said pintle having a clamping edge engaging said clamping shoulder, and securing means securing said pintle to said hinge part with said clamping edge in tight clamping engagement with said clamping shoulder to hold said journal in said pocket.

17. The hinge part of claim 16 wherein said pocket has a bottom pocket surface, said bottom pocket surface and the bottom of said mounting end of said journal being roughened, said roughened surfaces being in tight engagement to nonrotatably hold said mounting end in said pocket.

18. The hinge part of claim 16 wherein said hinge part has a pair of oppositely facing pockets separated by a wall, said mounting end being received in one of said pockets, said wall having a hole therethrough in alignment with said hole in said mounting end of said journal.

References Cited
UNITED STATES PATENTS

| | | | |
|---|---|---|---|
| 2,780,830 | 2/1957 | Kammerer | 16—169 |
| 2,904,824 | 9/1959 | Kuehl | 16—153U |
| 3,107,758 | 10/1963 | Benham | 16—153UX |
| 3,134,134 | 5/1964 | McCubbin | 16—153 |

FOREIGN PATENTS

| | | | |
|---|---|---|---|
| 663,524 | 1965 | Belgium | 16—168 |

DONALD A. GRIFFIN, Primary Examiner

U.S. Cl. X.R.

16—169